US007513575B1

(12) United States Patent
Go

(10) Patent No.: US 7,513,575 B1
(45) Date of Patent: Apr. 7, 2009

(54) SHOULDER- AND NECK HOLDER

(76) Inventor: Giok Djien Go, Pfahlgrabenstr 45, D-65510 Idstein (DE) 65510

( * ) Notice: Subject to any disclaimer, the term of this patent is extended or adjusted under 35 U.S.C. 154(b) by 0 days.

(21) Appl. No.: 09/554,464

(22) Filed: Nov. 10, 1998

(30) Foreign Application Priority Data

Nov. 11, 1997 (DE) ................................. 197 58 498

(51) Int. Cl.
*B60R 21/00* (2006.01)
(52) U.S. Cl. ..................... 297/486; 297/484; 297/216.13
(58) Field of Classification Search ................. 297/486, 297/487, 216.13, 216.14, 216.12, 484
See application file for complete search history.

(56) References Cited

U.S. PATENT DOCUMENTS

| 2,833,554 | A |   | 5/1958  | Ricordi            |         |
|-----------|---|---|---------|--------------------|---------|
| 3,165,357 | A | * | 1/1965  | Ruedemann, Jr.     | 297/484 |
| 3,392,989 | A |   | 7/1968  | Graham             |         |
| 3,713,694 | A | * | 1/1973  | Miller             | 297/486 |
| 3,829,158 | A | * | 8/1974  | O'Connor           | 297/486 |
| 3,901,550 | A |   | 8/1975  | Hamy               |         |
| 4,063,778 | A | * | 12/1977 | Chika              | 297/484 X |
| 4,700,632 | A | * | 10/1987 | Schmutz            | 297/486 |
| 5,529,382 | A | * | 6/1996  | Burkat             | 297/487 |
| 5,544,918 | A |   | 8/1996  | Fleming et al.     |         |
| 5,758,582 | A | * | 6/1998  | Gnezdilov          | 297/486 |

FOREIGN PATENT DOCUMENTS

| DE | OS 2152146      | 4/1973  |
|----|-----------------|---------|
| DE | 37 06 394 C1    | 2/1987  |
| DE | 39 33 721 A1    | 10/1989 |
| DE | 92 02 219 U1    | 2/1992  |
| DE | 42 38 549 A1    | 11/1992 |
| DE | 197 58 497 C2   | 11/1997 |
| EP | 0003354 A1      | 8/1979  |
| EP | 04234348 A1     | 2/1990  |
| EP | 1 037 773 B1    | 11/1998 |
| JP | 01094053 A   *  | 4/1989  |

* cited by examiner

*Primary Examiner*—Anthony D. Barfield
(74) *Attorney, Agent, or Firm*—Giok Djien Go

(57) ABSTRACT

A shoulder- and/or neck-holder, seat-belt, seat and sets of vibration-dampening energy-absorbers are integrated into an energy-absorbing, vibration-dampening safety-seat in order to restrain the shoulders and/or neck of a belted passenger, dampen vibrations and gradually absorb subenergies, resulting from a subdivision of the total energy, just below the respective injury-irrelevant threshold-values in any real-world accident of a transport-system, submarining or during in-flight turbulence. The conversion of an adult-seat into a child-seat or a baby-cot or vice-versa is simple. A rotatable device makes the holder easy to use.

Neck- and/or shoulder-shaped, height-, width-adjustable holders and/or neck- and/or shoulder-shaped energy absorbers, attached thereto, ensure complete restraint of the shoulders and necks of passengers with different weights and body-proportions.

For the convenience of the passenger or in cases of emergency all latch-plates are disengaged from the buckle-assemblies and/or the rotatable holder is repositioned to the resting position on depression of a master release-button.

52 Claims, 8 Drawing Sheets

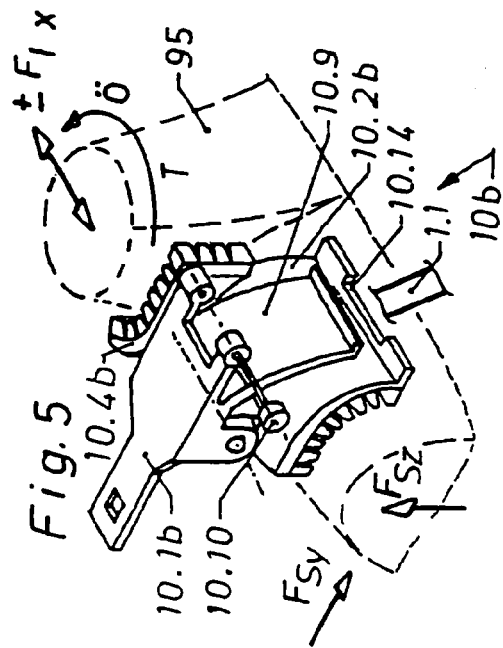
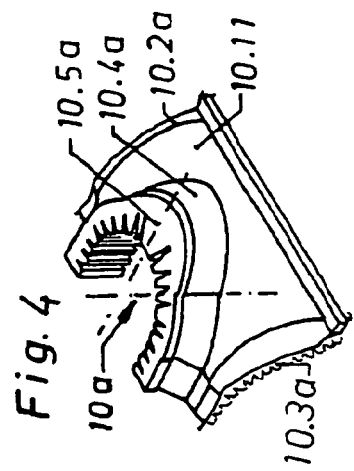
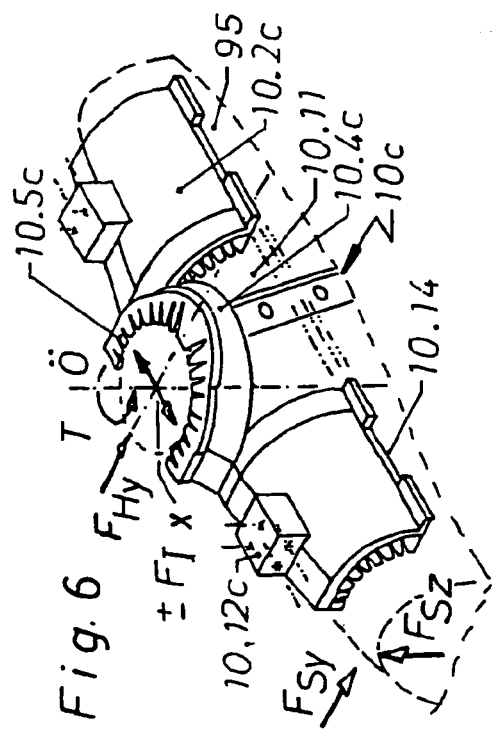
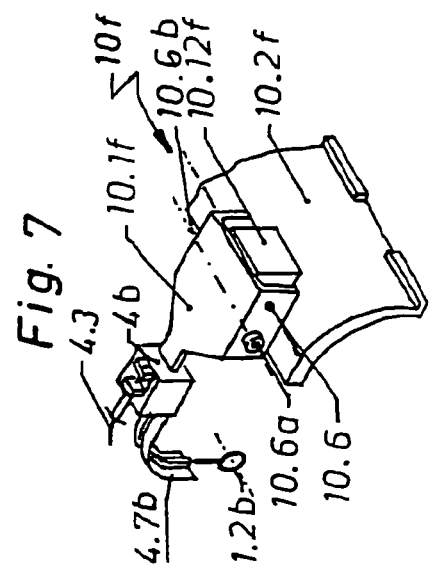

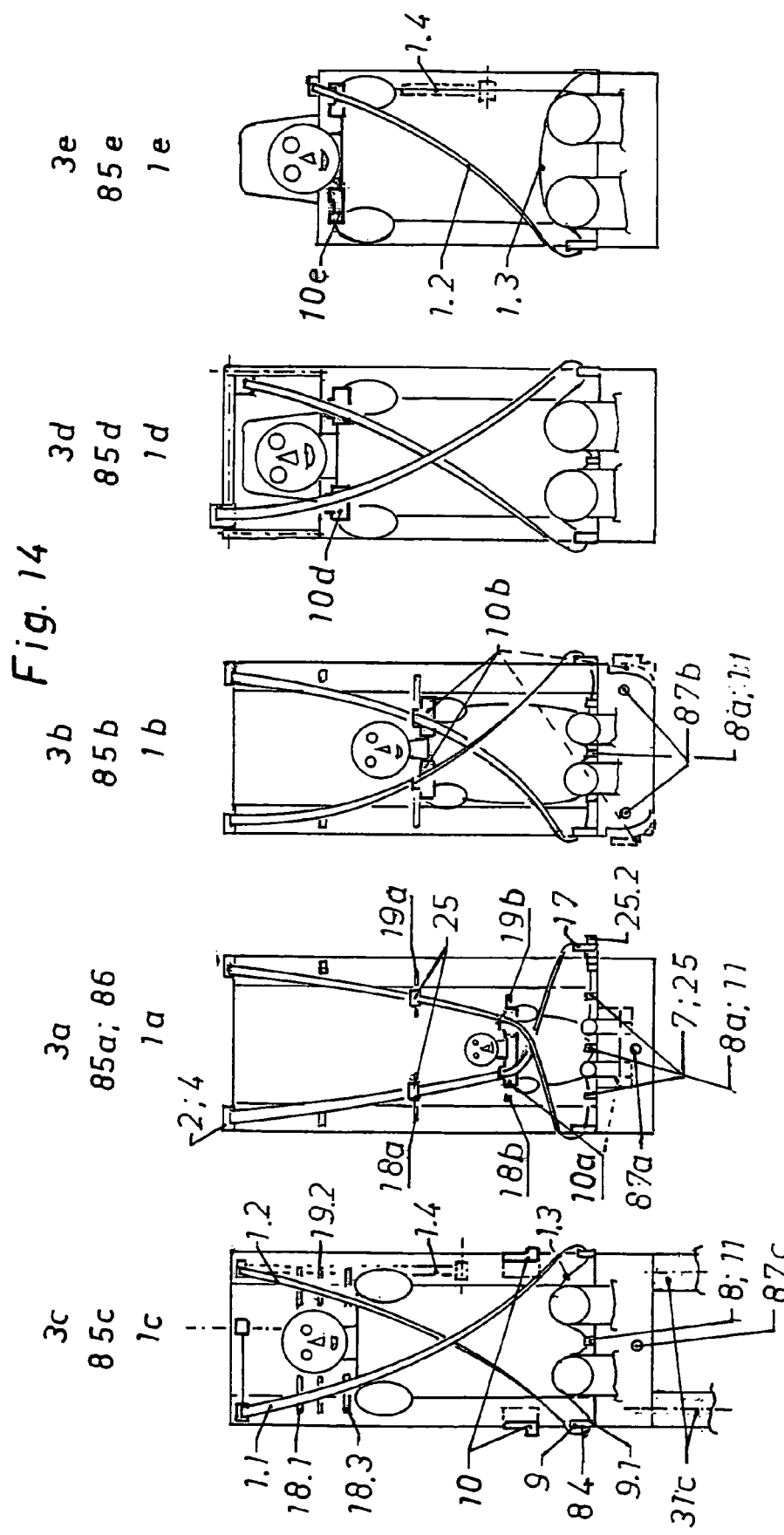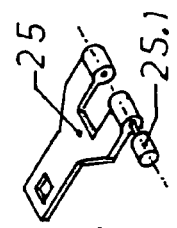

SHOULDER- AND NECK HOLDER

CROSS REFERENCE TO RELATED APPLICATIONS

This is an international application number PCT/DE98/03271 (WO 99/24292, European Patent EP 1 037 771 B1, German Patent DE 197 58 498 C2 and Canadian Patent CA 2,314,345) filed Nov. 10, 1998 and claiming the priority of DE 197 58 498 A1 filed Nov. 11, 1997.

1. FIELD OF THE INVENTION

The present invention relates generally to a shoulder- and neck holder, which restrains the shoulders and neck of a belted passenger, an anti-submarining seat-belt assembly as well as a safety seat in order to dampen vibrations and substantially reduce the acceleration-depending loads below the injury-related values
in an event of arbitrary accident of a vehicle, train or an aeroplane or
in an inflight turbulence.

2. DISCUSSION OF THE RELATED ART

It is known in the prior art to provide
a three-point seat belt (safety belt or lap-shoulder seat belt) consisting of a shoulder belt extending across the torso and of a lap belt extending across the lower part of body in motor vehicle;
a two-point seat belt acting as lap belt extending across the lower part of body in an aeroplane or a rear seat of vehicle or
a seat-belt substitute for restraining the shoulders, upper part of the body and/or neck.

In order to formulate in single terminology a generalized definition for the proper term is presented:
"belt portions 1.1, 1.2, 1.3 and 1.4" for members of a multi-point seat belt 1a to 1d (FIGS. 1, 14) ref to EP 1 037 773 B1 (WO 99/24294, PCT/DE98/03270, DE 197 49 780 C2, CA 2,313,780). The upper part of body is restrained by extending the shoulder belt portions 1.1, 1.2 crosswise in an "X-shape" while the lower part of body is restrained by the lap belt portion 1.3.
"belt portions 1.2, 1.3 and 1.4" for members of a three-point belt 1e to restrain the upper part of body and to restrain the lower part of body, shown in FIG. 14;
"belt portion 1.3" for conventional two-point or lap seat belt;
"floor 6" for vehicle-, train- or aeroplane floor (FIG. 14);
"seat frame" for frame of seat backrest or seat-cushion;
"accident" of a vehicle, train or aeroplane for front-, side-, rear collision of a vehicle or pile up (mass accident) or for train-, aeroplane accident or turbulence-related vibrations of an aeroplane;
"energy-absorption" for absorption and release of impact energy as well as dampening vibrations;
"undampened energy-absorption" for absorption and release of impact energy while vibrations are undampened;
"energy-absorbing method" for gradually absorbing subenergies "$\Delta F_i$", the addition of which is equal to total energy "$F_n$" or belt force (FIG. 9) and the increment i of which increases from 1 to n, below the respective injury-related values by undampened energy-absorption, energy-absorption, preserving the clamping and friction forces of control-clamping elements associated with the fracture of the sites of predetermined fracture of clamping elements and energy absorbers during the energy-absorption, thus enhancing the survival chance and ensuring the restraint below the tensile strength of seat belt.

It is well known to restrain passengers, particularly, of vehicles with seat belts in the event of accident, where a small forward motion of the upper part of body at low speed is acceptable. However, in the crash tests at speed of 55 km/h the rotating masses of torso 95.2 and head 95.1 are thrown forward and twisted by the acceleration-dependant loads [1, 2, 6 to 8].

Due to lack of restraint systems in trains passengers are not restrained, thus subjected to severe or fatal injury when ejected from the seats in accidents.

It is well known to restrain passengers of aeroplanes by two-point or lap seat belts, which are incapable of restraining the upper part of body as well as head in accidents, particularly associated with sudden turbulence. Consequently, severe/fatal injuries have been reported and, for sure, will be reported in the future.

Ref. to U.S. Pat. No. 2,833,554 a passenger, sitting on the seat, is restrained by a head shielding plate, chest shielding plate and at least one knee shielding plate, all of which are provided with arms pivotally mounted to a column fastened to the vehicle roof and tunnel. U.S. Pat. No. 3,392,989 has the same feature.

U.S. Pat. No. 3,713,694 teaches a pair of rotatable U-shaped shoulder-arms, connected to each other by an upper crank shaft transversely arranged in the upper portion of the seat backrest, and a lever arm, which, adjacent to the side of the seat cushion, is connected to a rotatable lower crank shaft, transversely arranged to the rear portion thereof and loosely connected to the upper crank, by a connector. When the lever arm is moved downwardly, the upper crank rotates the U-shaped shoulder-arms downwardly to restrain the shoulders of a passenger, sitting on the seat. DE-OS 2152146 has the same feature.

U.S. Pat. No. 3,829,158 addresses a body-restraining device comprising a rotatable U-shaped hook, both ends, provided with a pair of pivots and arranged in the seat backrest. When rotating from a resting position, in which the U-shaped hook is located above the head, to an operative position the U-shaped hook envelopes the upper part of the body of a passenger sitting on the seat.

Ref. to U.S. Pat. No. 4,700,632 a passenger, in a standing position on a roller coaster, is restrained by a device comprising a seat placed between his legs, a back member, into which a head rest is incorporated, and a pair of arms, one of which remains fixed and the other is movable, defines a harness for retaining the upper part of his body.

U.S. Pat. No. 5,529,382 addresses an over-shoulder-rotatable operating device, permitting fine adjustments of two pairs of pivoting arms to a body proportion, for amusement attractions. The device comprises a lower plate, resting against the passenger's abdomen and the pairs of pivoting arms, the first pair located behind and above the passenger's shoulders and the second pair in conjunction with the lower plate in front of the passenger.

Ref. to EP 0003354 A1, equivalent to DE-OS 2803574, a seat backrest has a pair of recesses at the seat sides to house a pair of rotatable legs of a U-shaped seat member in a resting position. In an operative position the legs are rotated vertically, thus facilitating the U-shaped seat member to restrain a child, sitting on the seat.

According to the above-listed patent documents U.S. Pat. No. 2,833,554, U.S. Pat. No. 3,392,989, U.S. Pat. No. 3,713,694, U.S. Pat. No. 3,829,158, U.S. Pat. No. 3,901,550 (DE-OS 24 28 285), U.S. Pat. No. 4,700,632, U.S. Pat. No. 5,529, 382, DE-OS 2152146 and EP 0003354 A1 (DE-OS 2803574) a restraint device, substituted for a seat belt (restraint system), restrains the shoulders, lap and/or abdomen of a passenger. This feature is in contradiction to the law, valid world-wide, enforcing the use of seat belts during travel. Unbelted passengers are not tolerated. Police fine them for belt violations. Recently, in Washington State a hefty $86 fine per passenger, imposed therefor, is legislated. Furthermore, Administrations world-wide would reject motor vehicles, equipped with such restraint devices, thus putting the car manufacturer out of business. Moreover, all the restraint devices need space, the design is bulky and unattractive. By no means can child-seats and/or baby cots be installed in the car. The overall stylish impression of the vehicle is not beneficial to sales. When cleaning, repairing or stepping in or out of the vehicle body, the passengers, in particular, children can stumble over such devices, unintentionally hit them and/or be obstructed, for example, by the seat harnesses, located in the resting position at the head level, ref. to U.S. Pat. No. 3,392,989. Evidently, all the restraint devices are incapable of absorbing great energy, dampening strong vibrations, ensuring the restraint of the passengers in any real-world accident, for example, submarining, rollover, multi-crash etc. As a result, passengers are exposed to the danger of being severely/fatally injured and/or burnt alive if the car catches fire. According to U.S. Pat. No. 3,901,550, that has the best feature among the above-mentioned restraint devices, the passenger is secured by the restraint of both shoulders and the pelvis 96 by means of two pairs of air-cushioned guard arms 16 and 18. The following problem cases cast doubt on the survival chance and applicability:

I. Due to the gap "$s_i$" between the shoulders and shoulder cap the shoulders and head 95.1 can oscillate. High injury severity results from
  1. large acceleration of head of a belted dummy about 83 g in the crash test of a vehicle without airbag [1],
  2. limited energy-absorption property of the air chambers to dissipate large energy of the upper part of body of belted dummy, thrown forward, by a force of about 64 g and
  3. lack of neck cap to dissipate large energy of the head, yaw-accelerated at the yaw angle O [2], acting as the second rotating mass.

A passenger, submarining (slipping downward) in a rear collision, releases himself from the restraint by the guard arms 16 and 18, thus exposed to severe/fatal injury.

In a real-world accident, the load cases of which are illustrated in FIGS. 1 and 2, the survival chance is low due to lack of energy- and shock absorber.

II. Upper part of body, defined by various outer contour from SC1" to "SC3", for example, upon putting a thick winter coat, can't be retained because only one outer contour "SC2" is configured when pulling together the air chambers 26 of guard arms 16 via a tension strap 30. The outer contour is determined by two body shapes (both shoulders and chest) and the passenger, whose circumference varies depending on the clothes worn.

III. The manufacturing costs for two pairs of guard arms and two feeding systems are higher than that of the shoulder- and neck holder including the seat belt.

IV. Passengers are severely/fatally injured in the event of submarining or rolling over.

According to DE 37 06 394 C1 a backrest of a front vehicle seat is equipped with deformation elements, which are deformed beyond the yield limit for the purpose of undampened energy-absorption when a passenger, seated in the front, is thrown against the seat backrest in a rear collision or an unbelted passenger, seated in the back, is thrown against the seat backrest in a front collision.

The supporting members of the seat backrest frame serve as deformation elements, to which expanding and contracting elements are arranged, the geometry of which and elastic limit of which vary along the length of the seat backrest.

Ref. to DE 42 38 549 A1 thin walls of a seat backrest frame are proposed for undampened energy-absorption.

According to DE 92 02 219 U1 a belt retractor, equipped with a clamping device, acts as delimiter of a restraint system in conjunction with deformation and energy-absorption. The belt retractor and clamping device are connected to each other by a plate with ribs. Due to clamping of the belt in excess of a threshold value the ribs are deformed, thus increasing the distance of the clamping device from the belt retractor. The energy, imposed on the belted passenger, is released by the fracture of predetermined sites of the ribs.

A seat ref. to EP 04234348 A1 is proposed for survival chance in a mid-front collision of car, train or aeroplane. A pair of energy absorbers is pivotally attached to a pair of front and rear seat legs, which are pivotally attached to the floor 6 and a seat-cushion frame. Each energy absorber consists of a rod, pivotally attached to the rear seat leg and floor 6 and having a cone-shaped end, and a tube, pivotally attached to the front seat leg and seat-cushion frame and having a cone-shaped collar to receive the end of the rod. During the movement of the seat in mid-front collision, the end of the rod expands (reams) the tube, thus performing work of deformation and friction in order to dissipate energy. For the purpose of gliding the end of the rod along the inner cylinder of the tube, the wall may not be cracked, but only deformed.

Exemplified by DE 39 33 721 A1, another energy-absorbing friction device, mounted to a vehicle part, has a tube, which is deformed by the belt force. The end of a rod, protruding through the tube, is connected to the seat belt and several barrels of a role (bearing balls) are arranged around the other end, inserted in the inner cylinder of tube. The outer diameter of the rod and barrels of a role is a little larger than the inner diameter of tube. Under the load of belt force the barrels expand the inner cylinder of tube.

A very low work of deformation and friction is achieved, nevertheless, this invention contains the first-promising feature which only in co-operation with the seat belt is able to effectively absorb energy.

U.S. Pat. No. 5,544,918 discloses an energy-absorbing management device, which comprises a crushable (deformable) honeycomb to absorb energy and a controller consisting of three-sensor mechanisms to monitor and sense the weight of the passenger, his forward motion and the severity of the vehicle collision. Unfortunately, sensors are incapable of evaluating crash data within few milliseconds and responsible for false deployment of airbags, resulting in decapitations, severe/fatal injuries and burns, which are reported in [6 to 8] and EP 0844939 B1 (U.S. Ser. No. 09/125,455). Due to the unreliable operation of sensors car manufacturer has no choice to start recall program, which impairs the reputation and is costly.

A more reliable and far cheaper energy-absorbing device is described hereinafter and in DE 197 58 497 C2.

U.S. Pat. No. 4,063,778 discloses an individual passenger-body restraining device for restraining an individual passenger of motor vehicle and for substituting a seat belt, head rest and airbags, comprising a) a pair of cables, a first end of each of which is provided with an open front hook, hooked up to a front receptacle of a length-adjustable belt, fastened to a vehicle floor;

b) an individual lap shield, which, transversely spanning a lower part of the body, is attached to lower sections of both cables;

c) an individual apron-shaped chest shield for restraining an upper part of the body, where it is attached to upper sections of both cables, second ends of which, jammed together and provided with an open rear hook, which is hooked up to a rear receptacle, fastened to a rear top portion of a seat backrest d) an individual napkin-shaped collar shield for intercepting a chin and neck of the passenger, when thrown forward.

All these individual members of that device have the following drawbacks:

D1. No agencies world-wide give approval to motor vehicles, equipped therewith, but without head rests, airbags and seat belts, thus resulting in bankruptcy of the car corp. Despite being restrained by a seat belt a 34-year old female lawyer was instantly dead due to strong yaw-accelerated forces when an old Honda Civic with two students, totally weighing approx. 920 kg, crushed at a speed of 50 km/h into the co-driver side of her two-year old BMW Z3 in Wiesbaden, the main city of the county Hessen. This tragedy is documented in an accident report "U211002" and a paper, published by VDI (Verein Deutscher Ingenieure). Both papers are incorporated herein. Despite being restrained by seat belts passengers are accelerated backwards into the seat backrests in real-world rear collisions, while overstretching their necks over the head rests, bending them backward, overstressing and fracturing them to severe/fatal injuries, when their head rests are adjusted too low and/or rated "dangerous" by Insurance Institute for Highway Safety in Arlington Va. 22201. Logically, the number of severe/fatal head- and/or neck injuries, neck fractures and/or slit throats will be dramatically increased due to lack of head rests and seat belts and installing chest-, chest- and collar shields, all of which made of metal, as mentioned in page 4/lines 62 and 65 of U.S. Pat. No. 4,063,778! In order to prevent seat belts from slitting body parts NHSTA has limited the belt force at 6,000 lbs, equivalent to 13,200 N, despite being aware of the failure of current restraint systems linked to great elongation of seat belts and damaging inner organs, ribs etc., all of which have threshold values far lower than 6,000 lbs. See elongation rates of two belt-webbing types over belt forces in FIG. 6 of PCT/US99/13362 (U.S. Ser. No. 09/098,294). For sure, the innovative, energy-absorbing, vibration-dampening shoulder- and neck holders in conjunction with energy-absorbing, vibration-dampening multi-point seat belts are able to prevent all these and other tragedies by absorbing gradually great impact energy, lower than injury-irrelevant threshold values and dampening strong vibrations, all of which are explained in the paper, above-mentioned, and in another paper, which, published in the well-known German car magazine "Auto Motor und Sport", is incorporated herein.

D2. All these shields, when not used, make an untidy impression. When using apron-shaped chest shields and napkin-shaped collar shields (page 6/line 35), CEOs are mistaken for brats who don't know the etiquette on dining. Apron-shaped chest shields with large cups discriminate women with small bosom and men while apron-shaped chest shields with small cups for obese women won't fit for attractive actresses with large bosom and men. Apron-shaped chest shields for skinny models won't fit for obese passengers. When being restrained by shields, all of which made of metal, passengers look like warriors in the Medieval Age. Hence, these devices are not beneficial for sales.

D3. Work related to manufacturing a large number of individual members, storing them, delivering and installing appropriate individual members is costly and time-consuming! When the individual members are laid out for, say, skinny, 1.3 meter tall Asians, all those devices are unfit for 1.6 meter tall Asians and, in particular, for obese, over 2 meter tall passengers. Due to different body proportions a driver must be hired to store a large number of individual members in various sizes in a truck, and drive it to the airport in New York and load them in an aeroplane for the transport to Tokyo, upon an urgent request of Japanese, intending to travel from Tokyo to Osaka, for having appropriate individual members. Nobody wants such cars, equipped with individual members!

D4. Because the open rear hook of the chest shield is hooked up to the rear receptacle and energy absorbers are not provided, under the load of the same belt force in real-world front collisions the deflection of the seat backrest is larger, thus increasing the forward motion as well as the danger of being crushed by an inflating airbag to death.

D5. For sure, the device fails to restrain an obese, over 150 kg heavy passenger and squeezes him to death in real-world front collisions. In addition, both cables, vertically extending over his ribs, fracture his ribs, damage his inner organs and squeeze paunch through a space, defined by the lap shield and chest shield, and both shields injure his other inner organs too.

D6. In general, all these individual shields are not popular because finding all three hooks, hooking up to the respective receptacles and releasing them in three operations are a lengthy process, especially in the dark. Furthermore, a butler must be hired to attach the open rear hook to the rear receptacle and detach. No car corporations will substitute one-click operating seat belts, head rests and airbags with those three-time operating, life-threatening devices.

D7. When using the device an actress must pull the collar shield through her head over the upper part of her body, while damaging her hat and hair-style. For sure, the actress will sue the car corporation, because she, severely injured, can neither appear in the film festival nor act in the film when her face, bosom and/or neck are squeezed by the individual chest and collar shields, all of which made of metal.

Of course, car corporations world-wide have no intention of taking the risk of going bankrupt resulting from
- lack of agencies' approval of cars, equipped with those life-threatening devices;
- being sued for compensatory damages of millions of dollars linked to severe/fatal injuries, missing film festivals, hiring butlers, drivers and hair dressers etc.; and
- lack of interest among people world-wide to buy cars, equipped with pieces of suits of armour which are ugly and life-threatening.

U.S. Pat. No. 3,165,357 discloses a safety device for restraining a passenger, comprising
- a pair of non-standard pelvis studs, each of which, rotatably arranged on a vertical bar of a seat backrest, is positioned outside the seat in a home position and moved up to the height of a pelvis and inwardly rotated to engage the non-standard pelvis stud with the pelvis in an operative position in a real-world accident; and a pair of shoulder straps, a first end of each of which is provided with a reel, rotatably arranged on a horizontal bar of a seat backrest and a second end of each of which is attached to a non-standard clasp, located in a slot of the seat backrest in a home position, where the passenger, when intending to restrain his shoulders, pulls both non-standard clasps out of the slots and attaches them to both non-standard pelvis studs.

All these non-standard members of that device have the following drawbacks:

E1. Costs for designing and manufacturing all these individual, non-standard pelvis studs for varieties of pelvises as well as for installing supplemental units are very high. In real-world accidents the height and size of the pelvis must be sensed and calculated by a sensor and a computer before moving and rotating both pelvis studs to that pelvis. It raises the question how can the "safety" device be put in operation up to 25 or 15 milliseconds in a real-world front or side collision without injuring the pelvis? For sure, the device fails to restrain an obese, over 150 kg heavy passenger, freeing himself from the shoulder straps, and squeezes his paunch through both pelvis studs to death in real-world front or rear collisions.

E2. The biggest drawback is the failure to ensure survival chance due to lack of energy absorbers, shoulder belt portions, extending crosswise in an X-shape over the upper part of the body, and belt retractors, each having a clamping device.

In real-world accidents passengers, accelerated by great impact energy, are crushed into death by the pelvis studs, each of which, made of metal, is inwardly rotated by large force to the operative position up to 25 milliseconds.

In real-world rollover accidents passengers, freeing themselves, are thrown into members of cars by great impact energy and ejected out of their respective cars.

In real-world rear collisions passengers, submarining, are severely/fatally injured.

In real-world front collisions passengers, freeing themselves due to great forward motion, are severely/fatally injured.

E3. When the non-standard members are laid out for, say, skinny, 1.5 meter tall Asians, all those members are unfit for obese, over 2 meter tall passengers.

E4. In general, nobody wants to use it because the operation to restrain is a lengthy process.

The operation of attaching the non-standard clasps of the shoulder straps to the pelvis studs and detaching consumes time, especially in the dark.

Of course, car corporations world-wide have no intention of taking the risk of going bankrupt resulting from lack of agencies' approval of cars, equipped with those life-threatening devices;

being sued for compensatory damages of millions of dollars linked to severe/fatal injuries etc.; and lack of interest among people world-wide to buy cars, equipped with life-threatening devices.

JP 01094053 teaches a suspender belt for restraining a passenger, comprising a pair of lap belt portions, which, fastened to a seat cushion, envelop his stomach when connected to each other in an operative position; and a pair of shoulder belt portions, each of which has a first end, fastened to a rear top portion of seat backrest and a second end, fastened to a vehicle floor, where both shoulder belt portions vertically extend from the rear top portion over his shoulders and an upper part of his body and through receptacles of the lap belt portions in the operative position.

F1. Each belt portion belt must always be adjusted to an appropriate length depending on the size of the passenger as well as using a winter coat or not.

F2. In general, suspender belts are not popular because all the belt portions make an untidy impression and are not beneficial for sales.

F3. This suspender belt is lack of energy absorbers and shoulder- and neck holders. As a result, passengers are subjected to great whiplash-related forces and strong vibrations.

F4. In real-world rollover accidents passengers, freeing themselves, thrown into members of their respective cars and ejected out of those cars, are severely/fatally injured.

U.S. Pat. No. 4,063,778 discloses a device for restraining a passenger seating on a seat of a roaster coaster car, when moving, comprising passenger-body enveloping unit with two side components, each having a front member and a rear member, provided with a hinge, fixed to a top portion of a seat backrest, where in an operative position a space for enveloping his body is defined by both front members and a transverse component, connecting both front members to each other;

a transverse member, fastened to the passenger-body enveloping unit, for resting on his thighs in the operative position; and a lock unit for locking the passenger-body enveloping unit after the transverse member, passing his forearms and stomach when moved from a home position to the operative position, rests on his thighs.

SUMMARY OF THE INVENTION

Accordingly, the principle object of the present invention is to provide for a belted passenger a transport system a shoulder- and neck holder which resolves the above-mentioned shortcomings and deficiencies, dampen vibrations and decreases all the loads below the injury-relevant threshold values in the event of a real-world accident, shown in FIGS. 1 and 2, or in an inflight turbulence.

A second object of the present invention resides in emergency operation by means of a common release button, when depressed, either to release all the all latch plates of the insertable shoulder- and neck holder from the respective buckle assemblies or to move a rotatable device of the rotatable shoulder- and neck holder back from the operative position to the resting position. By law passengers travelling in a motor vehicle or experiencing flight-turbulence must remain belted. The need for a belted mother to turn around becomes apparent, because she must attend to her belted children crying and sitting on the rear seat.

A third object of the present invention resides in one-click operation by means of a master release button, when depressed, to release the main latch plate and all the additional latch plates from the main and supplemental buckle assemblies, either to release all the all latch plates of the insertable shoulder- and neck holder from the respective buckle assemblies or to move the rotatable device of the rotatable shoulder- and neck holder back from the operative position to the resting position. In emergency cases paramedics and fire-fighters can easily rescue the injured passengers. Within seconds the passengers can step out of the transport system when catching fire.

A fourth object of the present invention resides in a cost-, space-saving integration of the a seat belt, the insertable shoulder- and neck holder, energy absorbers, sets of vibration-dampening energy absorbers, an anti-submarining seat-belt assembly and the seat into an energy-absorbing, vibration-dampening safety seat, which can be converted into a safety baby-cot 86, safety child-seat 85a, 85b or safety adult-seat 85a to 85e or vice-versa, illustrated in FIG. 14. As a result, the rate of seat occupancy in a bus, train or an aeroplane increased and there is no need to purchase child-seats and baby-cots and transport them, when not used, back anymore.

INDUSTRIAL APPLICABILITY

It should be apparent that the invention provides a substantially improved restraint including the following features:

In compliance with the law, valid world-wide, enforcing the use of seat belts by the use of the conventional or newest seat belt ref. to WO 99/24294, the restraint of shoulders and/or neck by the shoulder- and/or neck holder can be determined before the travel/flight or in accident/turbulence or in excess of a threshold speed e.g. over 80 km/h. The deflecting point or end of a conventional seat belt 3e (FIG. 14) is located at the top edge of seat backrest. The compound of two restraint systems 1c/10, 1a/10a, 1b/10b, 1d/10d, 1e/10e minimizes movements/motions/torsions and all acceleration-dependant loads (FIG. 1), imposed on shoulders, neck, torso, the lower part of body and, in particular, head acting as the 2nd mass.

The upper part 95 of body consists of torso 95.2 and head 95.1. In the z-y and x-y plane (FIG. 1) the pitch- and yaw angle $U_S$ and O of the 1st mass of torso about the rotating "S"- and z-axes converge toward zero owing to the restraint of shoulders of the belted torso, thus reducing the forward motion, pitch acceleration $\ddot{U}_S$-, $\ddot{U}_H$- and yaw acceleration O-dependent forces $F_{Sy}$, $F_{Hy}$ and T in arbitrary front collision. Analogously, the forces T, $F_{Sx}$, $F_{Ix}$ and/or $F_{Sz}$ are reduced in arbitrary side collision and/or rollover. This feature contributes to new development to increase the reliability of substitutes for airbags. Due to the unreliability and false deployment of airbags newspapers [3] have reported recall programs, decapitations, severe/fatal injuries, burns etc.

Beyond doubt, one-piece neck cap 10.4a, 10.4c, rigidly connected to shoulder cap 10.2a, 10.2c, sustains the neck e.g. of a cervical trauma suffering passenger at the best. If such shoulder- and neck holders 10a, 10c were installed in a vehicle or an aeroplane, healthy passengers would reject to use them when it is hot or the passenger is wearing tie or jewellery around her/his neck. This controversy is resolved by the features of one the Claims 1 to 4 in association with one of Claims 7 to 10.

By making the caps 10.2, 10.2a to 10.2f and a number of the respective alternate energy absorbers 10.3, 10.3a even a passenger with broad shoulders can use the holder by changing shoulder caps.

Moreover, the overall stylish impression of seats is spoilt by shoulder- and/or neck-shaped caps, when not in use, thus impairing the sales. Understandably, the design of caps of holders e.g. 10, 10b (FIG. 14) for expensive luxury cars depends, principally, on the form of the seat 3c, 3b. It is more likely that seats of expensive luxury cars are equipped with shoulder- and neck holders 10d, 10e (FIGS. 1, 8), which are located in the seat backrests when not used. To protect the broad shouldered passenger the shoulder caps must be changed. The decision for shoulder- or seat-shaped caps depends on the purpose of holders installed in the motor vehicle (bus, ambulance, van, luxury car etc.), train and aeroplane. This controversy is resolved by the features of one the Claims 17 to 21.

The problem case II, aforementioned, is resolved by variable restraint of a single body member comprising the shoulders and neck. Preferably, one- or two-piece, shoulder-shaped energy absorbers 10.3, 10.3a can be detached from one- or two-piece, deformable caps 10.2, 10.2a to 10.2f and one- or two-piece, neck-shaped energy absorbers 10.5, 10.5a, 10.5c from one- or two-piece, deformable caps 10.4, 10.4a to 10.4c, 10.4f as well as fastened thereto via adhesive fastener such as zip-, snap-in- or Velcro fastener. The absorber as well as cap can be made of one- or two pieces. For the purpose of cost saving associated with the demand for passengers, with different neck- and shoulder shapes, a large number of neck- and shoulder-shaped energy absorbers 10.3, 10.3a, 10.5, 10.5a, 10.5c and a low number of caps are produced. FIG. 14 exemplifies the adaptation of the holder to the body proportion of a child, sitting on the seat 3a, 3b, by using detachable holder 10a, 10b.

For the purpose of quick storage and removal, the holder 10a to 10c is inserted into the seat backrest or -cushion of seat 3a to 3c (FIG. 14), secured by inserting the pair of latch plates 10.1, 10.1b, 10. If therein and released by pressing the release button 87a to 87c. Both latch plates of shoulder- and neck holder 10a are disengaged from seat cushion 3.1a (FIG. 14) by pressing the release button 87a. As front portion of that seat cushion the holder 10a is removed from the cutaway portion (opening) to exploit its space for accommodation of both lower legs of a child sitting on the rear portion thereof.

For the convenience of the passenger and in cases of quick-rescue and emergency a master release button 84 of lap buckle assembly 9.1 is pressed to release all latch plates of the seat belt from the respective buckle assemblies and to move the holder 10d, 10e back from the operative position to the resting position or to release all latch plates of holder 10, 10a to 10c, 10f from the respective buckle assemblies.

Both casings 29a of rotatable device 28a are guided by two pairs of inner tubes 71, 72 of seat backrest frame 3.4d, 3.4e and can be locked in the required height.

Large impact energy is absorbed, during which vibration is dampened, by fracture of pads of predetermined fracture "$S_{11}$" to "$S_{mn}$" and "$H_{11}$" to "$H_{nm}$", which define the energy absorber 10.3, 10.3a and 10.5, 10.5a, 10.5c;

fracture of sites of predetermined fracture "s" of spring 10.9;

fracture of sites of predetermined fracture of clamping elements of the following sets of energy absorbers 30, 40, 50 (FIGS. 10 to 12) having control-wires 37, 47, 57, representing 40e, 40f having wires 47e, 47f, which are tautly, less tautly and/or loosely connected to holder 10e; and friction of clamping elements 32.1 to 32.e, 42.1 to 42.e, 52.1 to 52.e, which move along the respective retaining elements 31, 41, 51.

The shoulder- and/or neck cap can be inserted or rotatably attached to or in the seat backrest. Furthermore, it can be adapted to the body proportion of a passenger by a width- and height-adjustable mechanism of the holder.

The sets of energy absorbers and accommodation thereof in the frame of seat backrest and/or seat cushion account for a method of construction to save space, weight and costs and to increase stiffness. Furthermore, the energy-absorbing elements are made by extrusion, depth extrusion, casting, die casting or of spring plate or of spring steel. A preference for the embodiments is given to elements, having round profile, which are the cheapest and easiest to manufacture.

The costs and reject rate are lowered by a single tolerance (over- or undermeasure of a round profile), pre-tensioning (biasing) the clamping elements on or in the retaining element and pre-assembling all sets of energy absorbers, which are pre-loaded, for the delivery and final assembly to the frame of seat backrest and/or seat cushion.

The position of clamping elements e.g. 42, 42.1, . . . , 42.$n$ to each other can be adjusted by choosing the adjusting holes "$L_1$" to "$L_e$" and/or by clamping the brackets 37$b$1 on the wires.

Owing to the property of the great energy-absorption by small mass, lighter materials such as magnesium-, aluminium-extrusion, die casting of GD-MGA12 or alloys or carbon/glass fibre-reinforced plastics, used for skis, are recommended for the caps of the holder, latch plates and parts of the set of energy absorbers.

Fracture of sites of predetermined fracture "s" can be used as court-evidence for a passenger having belted in the accident.

Retaining elements (FIGS. 1, 10-12), integrated into the frame of seat backrest and/or seat cushion, enormously increase the stiffness of seat. The buckle assemblies, receiving the latch plates, are sustained by the frame of seat backrest and/or seat cushion. Advantageously, retaining elements such as 31$c$ can be exploited as the seat legs of the seat 3$c$ (FIG. 14).

Two- or three-point seat belt can be equipped with sets of energy absorbers. The guide pieces of buckle assemblies, plug-in connected to the respective latch plates, have two functions to integrate energy absorbers into the two-, three- or multi-point seat belt and to guide the movement of the buckle assemblies, when loaded or unloaded.

Due to the increased tension on the wire the clamping element performs the work of deformation and friction, which is released in excess of threshold value resulting in fracture of sites of predetermined fracture "s", two sites shown in FIG. 1, upon the contact with both heads of stop pin or bolt 46.1, . . . , 46.$n$. The site of predetermined fracture can be formed as crack, corrugation, hole or recess.

In another embodiment the performed work (energy) is released by fracture
in excess of the yield limit of the clamping element,
due to constrained deformation of carrier piece or expanding (reaming) the clamping element upon the contact with a wedge-shaped stop element 41.3 (FIG. 11) or with a wedge-shaped rib 41.1, 51.1 (FIG. 12).

Generally, the energy absorber consists of a tube-shaped base body with/without rib, serving as retaining element, and at least one clamping element, which is arranged to or in the retaining element. Wires are employed to tautly, less tautly and/or loosely connect clamping elements to each other, whereby a row of energy absorbers e.g. R42 (not denoted) is defined from the expanding clamping elements 42, 42.1 to 42.$n$ and the retaining element 41 (FIG. 11). In similar manner the other rows of energy absorbers such as R32, R52 etc. can be built together;
rows of energy absorbers to define a set of energy absorbers 30, 40, 50 (FIGS. 10 to 12) and
sets of energy absorbers to couple member 1.2$a$, 1.2$b$ of tie band (catch band) 1.1$a$, 1.1$b$, 1.5, 1.6, 47$e$, 47$f$ (FIGS. 1, 13$a$ to 13$e$) to dissipate subenergies "$\Delta F_i$" by applying the energy-absorbing method.

Injury-irrelevant threshold value is defined by the difference between two forces "$\Delta F_i$", lower than the injury-related load. The threshold values may have different magnitudes. For the energy-absorption up to the starting threshold value "$\Delta F_1$", at least one clamping element 42$e$, 42$f$ (FIG. 1) or energy absorber 10.3, 10.3$a$, 10.5, 10.5$a$, 10.5$c$ is responsible.

In order to prevent vibration and to fix the onset of energy-absorption at least one control-clamping element 52 must be biased up to an onset force-level e.g. "$\Delta F_1$-500 N", which is lower than "$\Delta F_1$". Over this onset force-level the element, pulled by the corresponding wire 57, performs work of deformation and friction, during which the energy "$\Delta F_1$" is released by fracture of sites of predetermined fracture of clamping element 42$e$, 42$f$, so that the passenger is neither injured nor thrown back. The energy increase about "$\Delta F_2$" is compensated by the fracture of at least one complementary clamping element 52.1 to 52.$n$, so that the passenger is neither injured nor thrown back. The gradual reduction of energy is repeated so long up to a load zone defined of "$\Delta F_e$-500 N", in which all clamping elements are broken, the control-clamping elements 52 cannot move anymore and at least one control-clamping element 42, biased at "$\Delta F_f$-500 N", and/or at least one clamping element of set of energy absorbers 40 perform(s) work of deformation and friction.

The energy increase about "$\Delta F_j$" is compensated by the fracture of the control-clamping elements 52 and/or of at least one complementary clamping element 42.1 to 42.$n$, so that the passenger is neither injured nor thrown back. The gradual reduction of energy is repeated so long till
1. the total energy "$F_n$" is consumed or
2. a new load zone defined of e.g. "$\Delta F_h$-500 N", in which all clamping elements are broken, the control-clamping elements 42 can't move anymore and at least one of the following sets of energy absorbers decrease energy, such as
   30, 40$a$, 50$a$ (not shown) of the other structural half of seat-cushion frame 3.3$a$,
   40, 50 of the other structural half of seat backrest frame 3.4$a$,
   30M, 40M, 50M, 65M (not shown) fastened to the cross members 3.41, 3.42 of seat backrest frame 3.4$a$ facing each other,
   30N, 40N, 50N, 65N (not shown) fastened to the cross members 3.31, 3.33 (not shown) of seat-cushion frame 3.3$a$ facing each other.

Because the passenger was subjected to a succession of injury-irrelevant threshold values "$\Delta F_i$", where i=1 to n, during the accident and restrained by the seat belt, tensile strength of which about 24,000 N is substantially higher than "$\Delta F_i$", he needs only to depress the master release button 84, detaching all latch plates from buckle assemblies, and egresses, unscathed, from the vehicle, train or aeroplane (FIGS. 1 and 14).

An energy-absorbing device, comprising a number of sets of energy absorbers, having different threshold values, is connected to the holder and to the latch plates of the seat belt in plug-in connection with the buckle assemblies of the seat backrest and/or -cushion.

In another embodiment a sound-proofing material 83, having arbitrary friction coefficient $\mu_0$, different or progressive friction coefficient, is attached to the contact surface of retaining element and/or clamping element for the purpose of dampening vibration and performing work of friction. Furthermore, it is possible to coat the retaining elements and corresponding clamping elements, thus eliminating any noise.

In the event of submarining and/or rollover the energy is dissipated by sets of energy absorbers, which are arranged in the seat-cushion frame and are tautly, less tautly and/or loosely connected to the buckle assembly.

A single seat can be equipped with holder for persons (adults and/or children) of different ages related to weight groups, which depend on the appropriate sets of energy absorbers. The sets of energy absorbers and/or energy absorbers have different threshold values. Owing to these features the survival chance of the passengers is enhanced and the seats, equipped therewith, can be modified to be used by adults or children, thus increasing the rate of seat occupancy in a train, bus or an aeroplane, exemplified in FIG. 14.

BRIEF DESCRIPTION OF THE DRAWINGS

A number of embodiments, other advantages and features of the present invention will be described in the accompanying tables and drawings with reference to the xyz global coordinate system:

FIG. 4 is a schematic, perspective view of a 2nd embodiment of an insertable shoulder- and neck holder 10*a* equipped with a wider chin-supporting neck collar 10.4*a*, energy absorbers 10.3*a*, 10.5*a* and latch plates 10.1*f*.

FIG. 5 is a schematic view of a 3rd embodiment of a half of an insertable shoulder- and neck holder 10*b* equipped with the energy absorbers 10.3, 10.5, 10.9.

FIG. 6 is a schematic view of a 4th embodiment of an insertable shoulder- and neck holder 10*c* equipped with energy absorbers.

FIG. 7 is a schematic view of a 5th embodiment of a half of an insertable shoulder- and neck holder 10*f*, equipped with a latch plate 10.1*f* in plug-in connection with a buckle assembly 4*b*.

FIG. 14 is a front view of safety seats 85*a* to 85*e*, 86, into which the seat belts 1*a* to 1*e*, sets of energy absorbers, shoulder holders 10, 10*a*, 10*b*, 10*d*, 10*e* and seats 3*a* to 3*e* are integrated, for passengers with different weights and body proportions.

FIG. 15 is a perspective view of a belt-detachable U-shaped latch plate 25.

DESCRIPTION OF THE PREFERRED EMBODIMENTS OF THE INVENTION

The advantages of the preferred embodiments, above-mentioned in the Chap. "Summary of the advantages . . . ", are outlined hereinafter with regard to the functions and features thereof.

Figure 9:
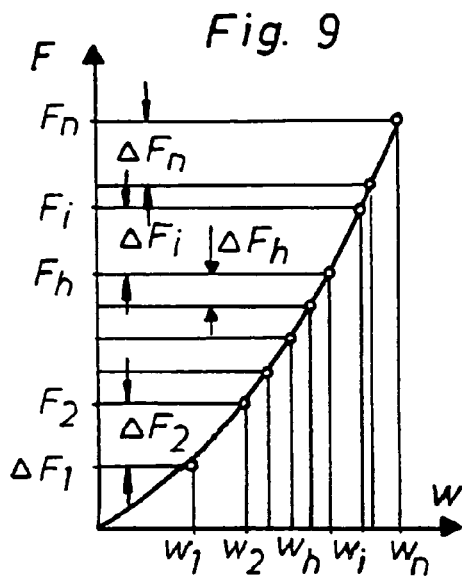
FIG. 9 illustrates a total load "$F_n$", absorbed by the restraint system in co-operation with an energy-absorbing, vibration-dampening device, in the event of a real-world accident.

The method of the present invention in co-operation with a seat belt capitalizes on the premise that the total energy (magnitude of energy) is subdivided (FIG. 9), at the best, into a number of subenergies which are released in excess of the respective injury-irrelevant values, pursuant to the energy-absorbing method, above-mentioned. This will be apparent by formulating all forces (FIG. 1), imposed on the torso 95.2, neck 95.3 and head 95.1 of the passenger, in the event of a real-world accident where the torso, both shoulders and neck of a passenger are restrained by the shoulder- and neck holder and three-point or multi-point seat belt and the energy of two masses of the torso and neck are absorbed by the energy-absorbers thereof. When the neck is properly restrained by a neck holder, the loads, imposed on the head, are substantially decreased. In addition thereto, this restraint system is able to dampen strong oscillations The features are applicable for any motor vehicle, provided with arbitrary post sections (pillars), train or aeroplane.

In the 1st to 7th embodiment the shoulder- and/or neck holder 10, 10a to 10f, shown in FIGS. 1, 3 to 8b, comprises
one- or two-piece caps 10.2, 10.2a to 10.2f with the shoulder-shaped energy absorbers 10.3, 10.3a and/or
one- or two-piece caps 10.4, 10.4a to 10.4c, 10.4f with the neck-shaped energy absorber 10.5, 10.5a, 10.5c.

Two-piece caps of the shoulder holder have an advantage over a one-piece cap of the shoulder holder that it can be put into use for a passenger with two different shoulders. The problem of the one-piece cap of the shoulder holder can only be resolved by the use of two different shoulder energy absorbers.

The cap of shoulder- and neck holder 10, 10b (FIGS. 3 and 5) is built by inserting a pair of neck-caps 10.4, 10.4b into a pair of shoulder-caps 10.2, 10.2b. This feature makes the design of the neck caps, insertably attachable thereto as well as detachable therefrom, possible. Thanks to such design the passenger can decide for the use of the neck caps. If he or she is born with a weak neck muscle, the pair of neck-caps must be insertably attached thereto. On a hot day the neck caps can be removed therefrom. However, for children and persons, having very weak neck muscle, in particular when suffering from cervical trauma, the neck-shaped cap 10.4a of holder 10a is recommended. Its wider chin-supporting energy absorber 10.5a (FIG. 4) improves the properties of bracing the head and substantially absorbing energy during the forward motion "$W_v$" of the passenger.

To restrain the shoulders and neck of a passenger, the one-piece holder 10a, in closed form and using a connecting cap 10.11, has the greatest stiffness, however by removing that connecting cap the holder 10c in open form does not block out air flow. This controversy is resolved by the stiff rotatable device 28, 28a of rotatable holder 10d, 10e in the different embodiments.

The latch plate 10.1 is pivotally attached to the flange 10.12 of shoulder- and neck holder 10 by pin 10.6 or by bolt 10.6a and nut 10.6b. The adjustment to the shoulder shape is done by rotating the bolt 10.7 in threaded hole of flange 10.12. Finally, that bolt is secured by nut 10.8. Time is greatly consumed for the removal of the belt from the closed apertures of cap 10.2 and the latch plate 10.1, to loosely guide the belt portion 1.1, in order to store the holder. Thanks to the open aperture 10.14 of cap 10.2b, 10.2c, 10.2f and open aperture of latch plate 10.1b, the belt, when strapped over the holder, can be loosely locked, guided by quick-release pin 10.10 and released by withdrawal of quick-release pin.

In the 5th embodiment ref. to FIG. 7 the latch plate 10.1f is secured to the flange 10.12f by pin 10.6, bolt 10.6a and nut 10.6b. In order to adjust the cap 10.2f along the width of the seat backrest the bolt 10.6a is rotated in the appropriate direction in the threaded hole of flange 10.12f.

Figure 8A:
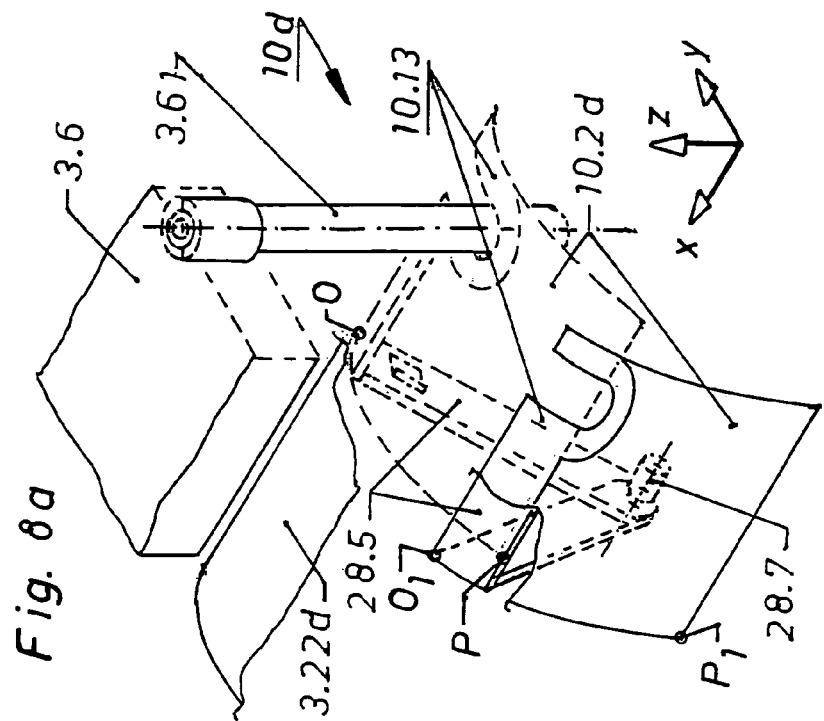
FIG. 8*a* is a perspective view of a 1st embodiment of a half of a rotatable shoulder holder 10*d*, rotated by the rotatable device 28 from the resting position "P" to the operative position "$P_1$"
Figure 8B:
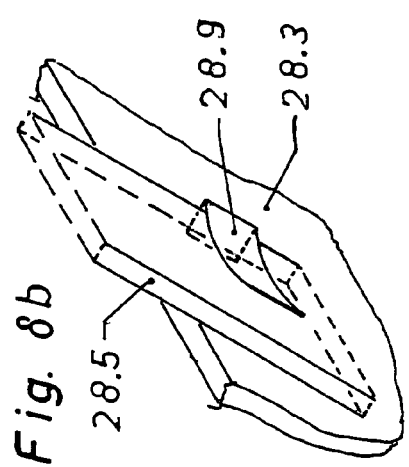
FIG. 8*b* is a perspective view of a rotatable lever 28.5 of the rotatable device 28 retained by a stop piece 28.9.
Figure 8:
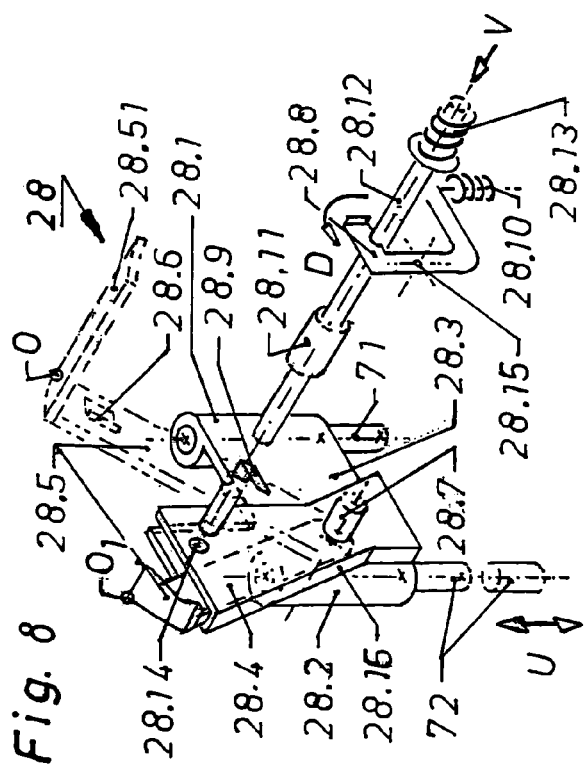
FIG. 8 is a perspective view of an embodiment of a rotatable device 28 rotating from a resting position "P" to an operative position "$P_1$".

In the 1st embodiment ref. to FIG. 8 each of the pair of casings 29 of rotatable device 28 of holder 10d consists of two outer tubes 28.1, 28.2, force-locking connected with a coupling wall 28.3, and an L-shaped plate 28.4, having a forward-motion catch 28.16 connecting to the coupling wall 28.3, First ends of the pair of rotatable levers 28.5 are connected to each other by a shaft 28.7, about which each rotatable lever 28.5, loosely guided between the plate 28.4 and the coupling wall 28.3, is rotated from the resting position "P" or "O" to the operative position "$P_1$" or "$O_1$" and vice-versa. A shoulder cap 10.2d, illustrated by a segment "PO" or "$P_1O_1$" in the resting or operative position, and a release cam 28.6 are fastened to a second end of each rotatable lever (FIGS. 8, 8a).

In the resting position "P" each cap is located in the seat backrest or on its upper portion underneath a seat cover 3.22d and, if available, underneath a head rest 3.6. If a supporting tube 3.61 is available, the cap, recessed about that supporting tube, must be reinforced by reinforcing plate 10.13. Alternatively, the transverse member 28.51 of rotatable lever 28.5, when having the shape thereof, can reinforce the recessed cap.

Figure 10:
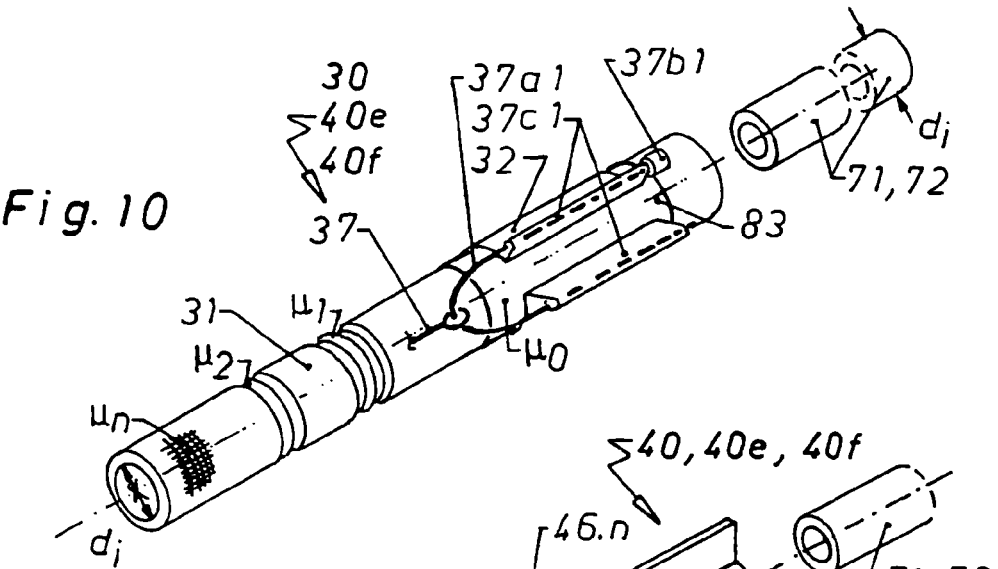
FIG. 10 is a schematic, perspective view of a 1st embodiment of a set of energy absorbers 30, 40*e*, 40*f*.
Figure 13A:
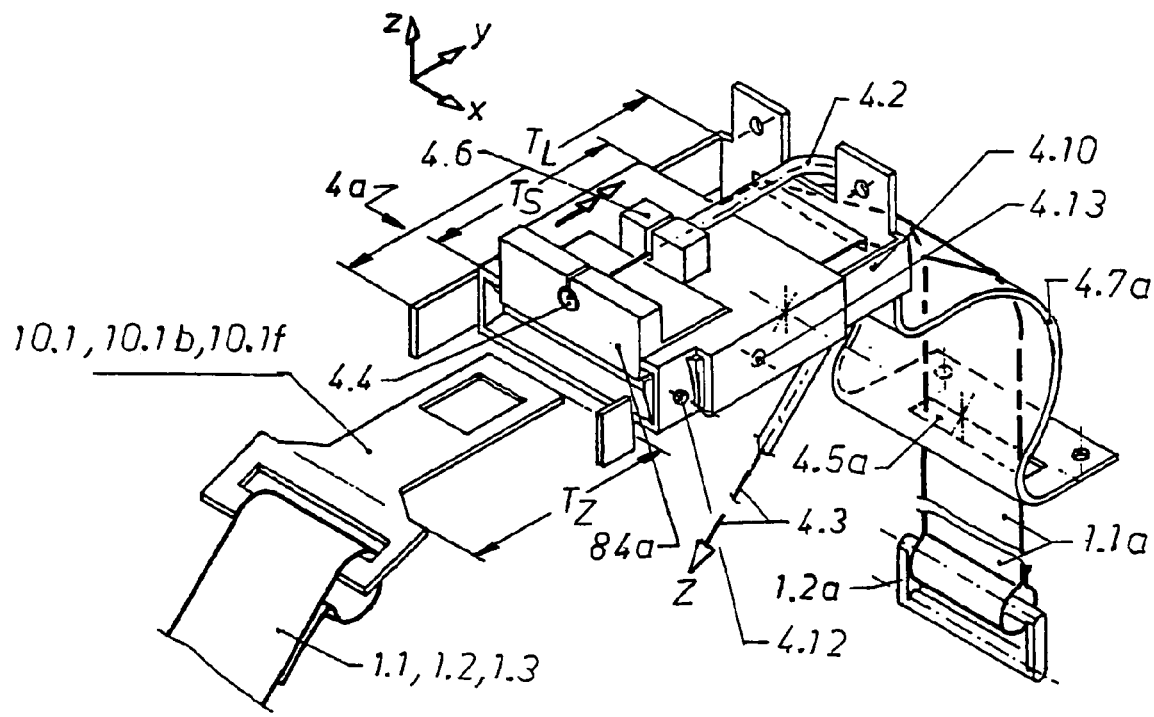
FIG. 13*a* is a schematic, perspective view of a 1st embodiment of a buckle assembly 4*a* comprising a guide piece 4.7*a*, release cable 4.2, tie band 1.1*a* and coupling member 1.2*a*.
Figure 13B:
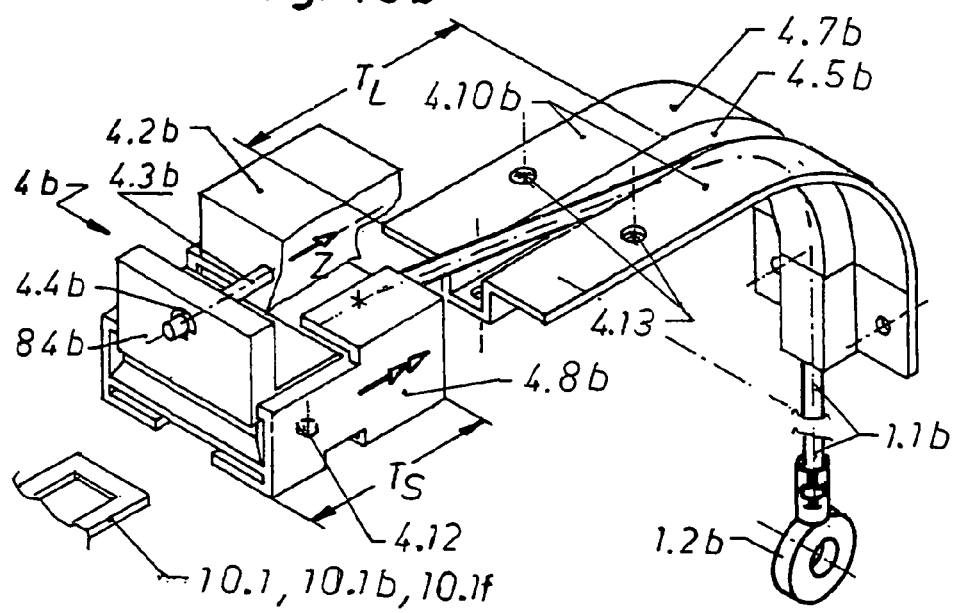
FIG. 13*b* is a schematic, perspective view of a 2nd embodiment of a buckle assembly 4*b* comprising a guide piece 4.7*b*, an electrical motor 4.2*b*, a tie band 1.1*b* and coupling member 1.2*b*.
Figure 13C:
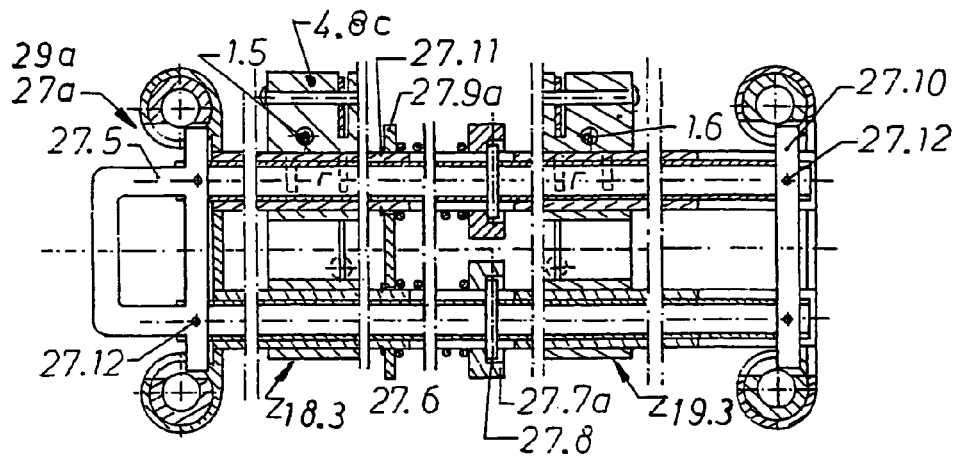
FIG. 13*c* is a cross-sectional view of buckle assembly 4.8*c*, adjustable along the width of the back rest, having two holes to loosely guide two tie bands 1.5, 1.6, and a height- and width-adjusting mechanism 27*a*, whose locking handle 27.5 is form- and force-locking connected to the slots of both inner tubes 27.4, along the line I-I of FIG. 3.
Figure 13D:
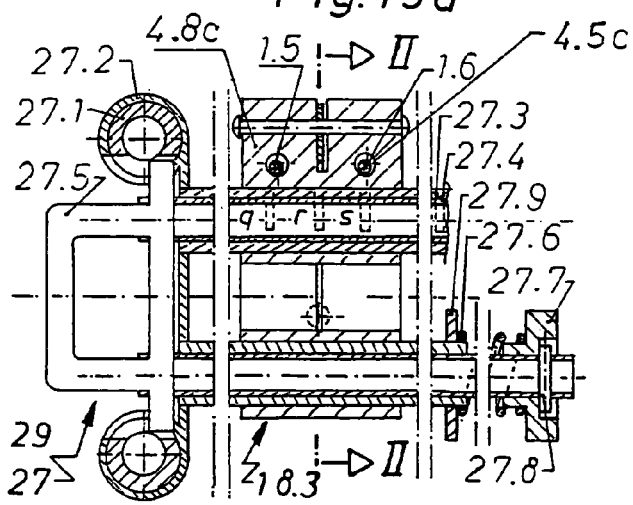
FIG. 13*d* is a cross-sectional view of buckle assembly 4.8*c*, adjustable along the width of the back rest, having two holes to loosely guide two tie bands 1.5, 1.6, and a height- and width-adjusting mechanism 27, whose locking handle 27.5 is form- and force-locking connected to the slots of the inner tube 27.4, along the line I-I of FIG. 3.
Figure 13E:
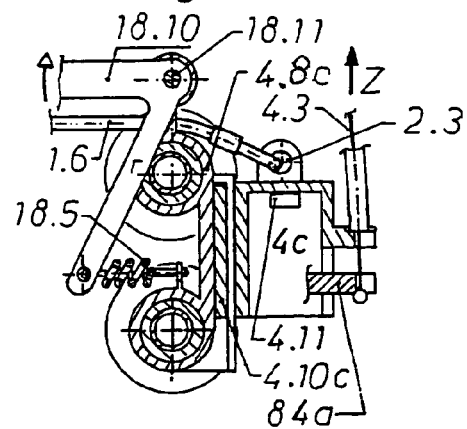
FIG. 13*e* is a cross-sectional view of a 3rd embodiment of a buckle assembly 4*c* comprising two tie bands 1.5, 1.6 along the line II-II of FIG. 13*d*.

Because the outer tubes 28.1, 28.2 are guided by inner tubes 71, 72 of seat-backrest frame 3.4d with outer diameter "$d_i$" (FIGS. 1, 10, 11), the height of the caps 10.2d in association with the rotatable device 28 can be adjusted to the body proportion in both directions denoted by arrow "U" (FIG. 8) by manual operation or by a drive apparatus 80 e.g. hydraulic-piston cylinder unit, electrical motor (not drawn), similar to 4.2b shown in FIG. 13b.

The drive apparatus 80 can be activated by a switch, release button, controller, sensor or an accelerator pedal. Upon e.g. tipping the switch or release button the drive apparatus moves the holder 10d back to the resting position.

For the convenience of the passenger stepping out of the vehicle or in cases of emergency all latch plates of the seat belt are disengaged and the drive apparatus moves the holder 10d back to the resting position when depressing the master release button 84 of lap buckle assembly 9.1 (FIG. 14).

Figure 1A:
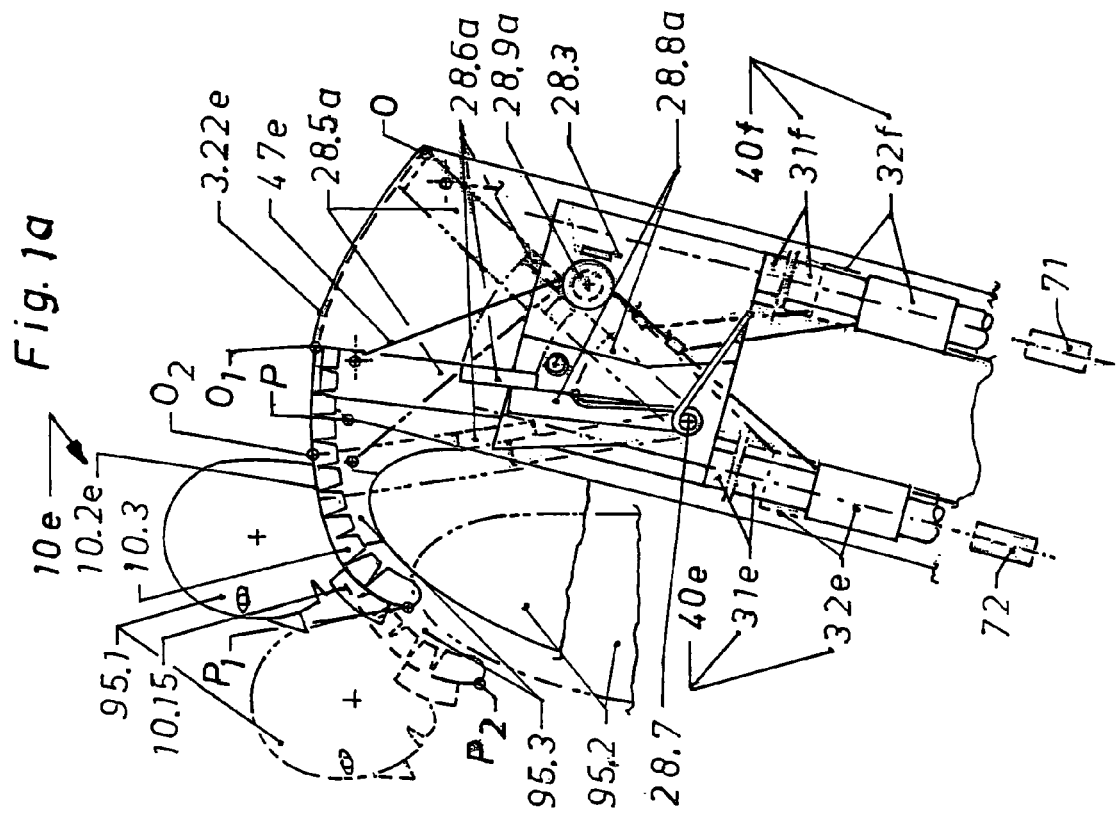
FIG. 1*a* is a side view a belted passenger whose shoulders are restrained by the rotatable shoulder holder 10*e*, which, equipped with energy absorbers 10.3, is rotated due to the forward motion from the operative position "$P_1$" to an accident-related position "$P_2$", according to the arrow R of FIG. 1.
Figure 2:
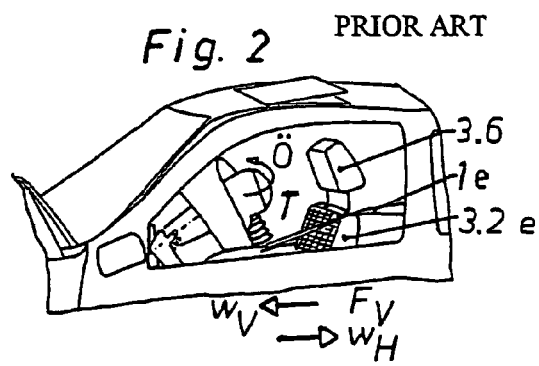
FIG. 2 is a perspective view of a restrained dummy, thrown forward in an offset crash test [1].
Figure 3:
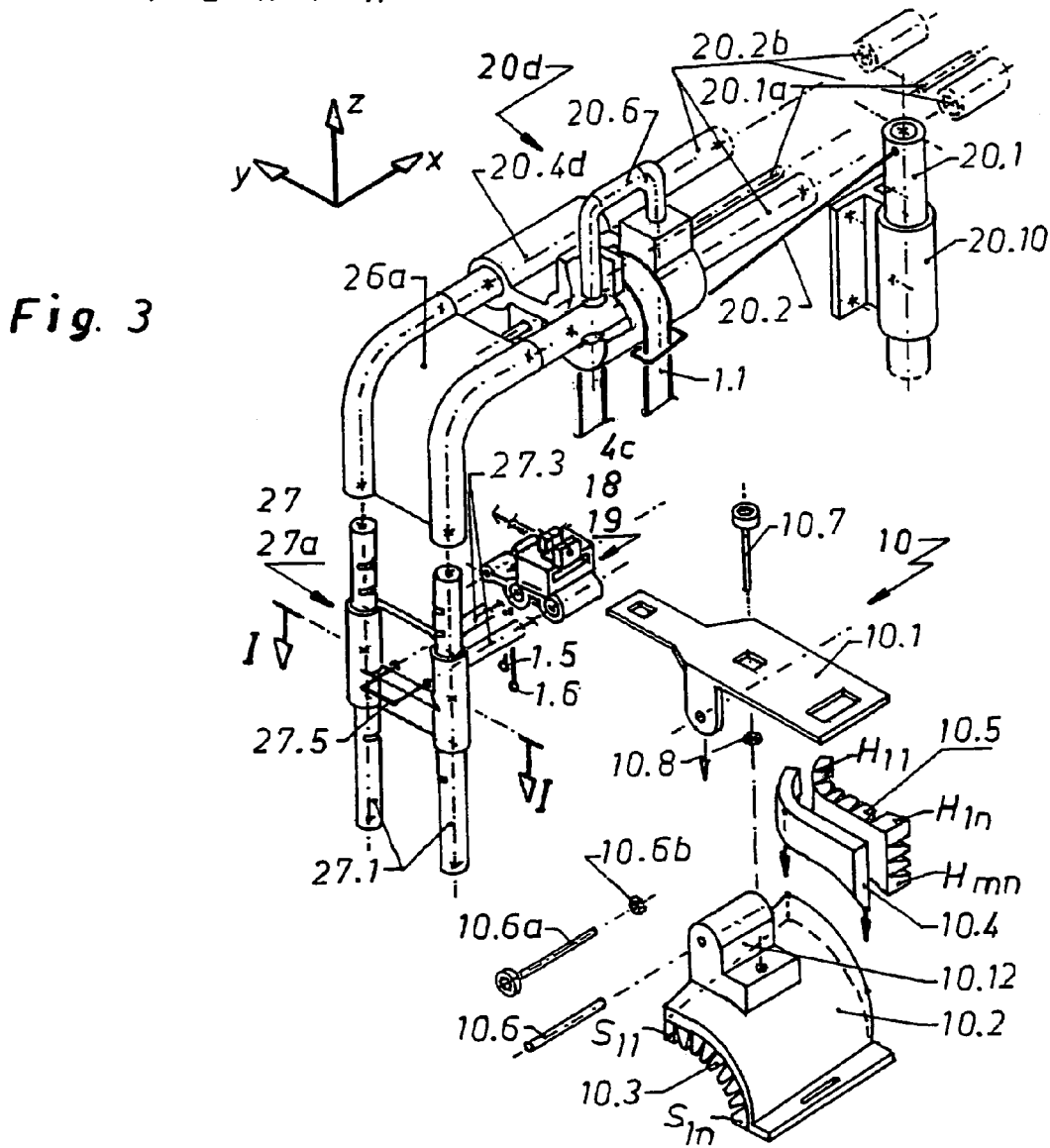
FIG. 3 is a schematic, perspective view of a 1st embodiment of a half of a shoulder- and neck holder 10 equipped with a set of energy absorbers 10.3, 10.5 and latch plate 10.1 and of a belt-feeding device 20*d*, provided with a pair of rollover tubes 20.2*b* and a safety bracket 20.6, and a height- and width-adjusting mechanism 27, 27*a*.

Due to the rotation of both rotatable levers 28.5, operated manually or by drive apparatus 80, a pair of release cams 28.6 in conjunction with a pair of devices (not shown) forces the rotation of lock pawls 28.8, pre-loaded (biased) by first springs 28.10, about the axis of pins 28.15 in the direction denoted by arrow "D". As a result, a pair of locking pins 28.12, pre-loaded by second springs 28.13, and loosely guided in guide tubes 28.11, moves in the direction denoted by arrow "V" from a resting position into the corresponding holes 28.14 at the coupling walls 28.3 and blocks together with the forward-motion catch 28.16 of the plate 28.4 the rotatable levers 28.5 in both directions. When blocked, in the event of accident the loads are reduced by the deformable holder 10d equipped with energy absorbers 10.3 (FIG. 1a). In front collisions the upper body part 95 of the restrained passenger is thrown forward (FIGS. 1a, 2) while both rotatable levers 28.5 are blocked by the forward-motion catches 28.16.

When the deformable holder 10d is withdrawn and the locking pins 28.12 are moved back to the resting position, both rotatable levers 28.5, moving from the operative position "$P_1$" to the resting position "P", snap into the respective spaces, defined by the stop pieces 28.9 and the coupling walls 28.3, and are retained therein (FIG. 8b).

Figure 1:
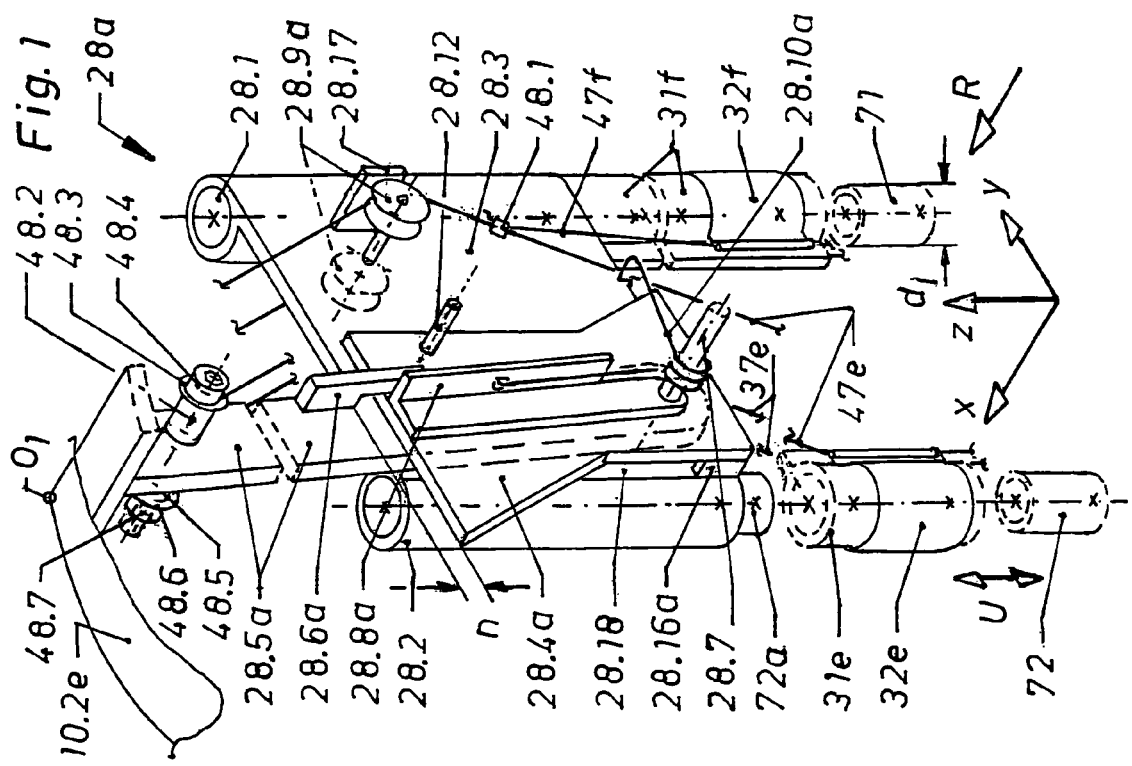
FIG. 1 is a perspective view a rotatable shoulder holder 10*e*, rotated by a 2nd embodiment of a rotatable device 28*a* from a resting position "P" to an operative position "$P_1$".

In the 2nd embodiment ref. to FIG. 1 each of the pair of casings 29a of rotatable device 28a of holder 10e consists of two outer tubes 28.1, 28.2, force-locking connected with a coupling wall 28.3, and an L-shaped, partly laterally closed and partly laterally open plate 28.4a, having a small front plate 28.16a, connecting to the coupling wall 28.3, and a forward-motion opening 28.18.

First ends of the pair of rotatable levers 28.5a are connected to each other by shaft 28.7, about which each rotatable lever 28.5a, loosely guided between the plate 28.4a and the coupling wall 28.3, is rotated from the resting position "P" or "O" to the operative position "P₁" or "O₁" and vice-versa. A shoulder cap 10.2e, illustrated by a segment "PO" or "P₁O₁" in the resting or operative position, and a release cam 28.6a are fastened to a second end of-each rotatable lever.

In the resting position "P" each cap is located in the seat backrest or on its upper portion underneath a seat cover 3.22e and, if available, underneath a head rest 3.6.

Because the retaining elements 31e, 31f, form- locking connected to the outer tubes 28.1. 28.2 by a pair of auxiliary tubes 71a, 72a and force-locking connected thereto, are guided by inner tubes 71, 72 of seat-backrest frame 3.4e with outer diameter "$d_i$" (FIGS. 1, 10, 11), the height of the caps 10.2e in association with the rotatable device 28a can be adjusted to the body proportion in both directions denoted by arrow "U" (FIG. 1) by manual operation or by a drive apparatus 80 e.g. hydraulic-piston cylinder unit, electrical motor (not drawn), similar to 4.2b shown in Fig. 13b.

The drive apparatus 80 can be activated by a switch, release button, controller, sensor or an accelerator pedal. Upon e.g. tipping the switch or release button the drive apparatus moves the holder 10e back to the resting position.

For the convenience of the passenger stepping out of the vehicle or in cases of emergency all latch plates of the seat belt are disengaged and the drive apDaratus moves the holder 10e back to the resting position when depressing the master release button 84 of lap buckle assembly 9.1 (FIG. 14).

Due to the rotation of both rotatable levers 28.5a, operated manually or by drive apparatus 80, a pair of release cams 28.6a forces the rotation of lock pawls 28.8a, pre-loaded (biased) by first springs 28.10a, about the axis of shaft 28.7, and activates a pair of switches (not shown). As a result, a pair of locking pins 28.12, pre-loaded by second springs 28.13 (FIG. 8), and loosely guided in guide tubes 28.11 (FIG. 8), moves from a resting position into the corresponding holes 28.14 (FIG. 8) at the coupling walls 28.3 and blocks the rotatable levers 28.5 in one direction.

When blocked, in the event of accident great loads are dissipated and strong vibrations are dampened by the deformable holder 10e equipped with energy absorbers 10.3 and a set of vibration-dampening energy absorbers 40e, 40f. The wire 47f is clamped (jammed) on the control-wire 47e at the clamping site by a bracket 48.1. Similarly, the control-wire 37f (not shown) is clamped on the control-wire 37e by another bracket (not shown). A wire-guiding piece 28.17 loosely guides the control-wire 37e, 47e. A wire-attachment assembly 48 comprises two wire-rings 48.3, 48.6, two sleeves 48.2, 48.5, a bolt 48.4 and nut 48.7. Both wire-rings 48.3, 48.6 of the control-wires 37e, 47e are fastened to the holder 10e by bolting the bolt 48.4, protruding therethrough and through both sleeves 48.2, 48.5, to the nut 48.7. The control-wires 37e, 47e, tightly, less tightly and/or loosely connecting the rotatable levers 28.5 to the rotatable levers 28.5 in the operative position "P₁" determines the onset of energy-absorption and vibration-dampening.

In front collisions the upper body part 95 of the restrained passenger, thrown forward to an accident-related position "P₂" or "O₂", moves the holder 10e, through the forward-motion opening 28.18, while the control-wires 37e, 47e pull via stop pieces 28.9a, serving as deflectors and pivots, the clamping elements 32e, 32f moving along the respective retaining elements 31e, 31f (FIG. 1a). During which the work of deformation and friction is achieved thereby. The stored energy is released in excess of the yield strength and/or of the threshold values. Additional clamping elements 32, 32.1 to 32.n, 42, 42.1 to 42.n, 52, 52.1 to 52.n can be arbitrarily arranged or be series-connected to clamping element 32e, 32f to absorb great energy and dampen strong vibrations.

The gap "n" (FIG. 1) between the release cam 28.6a and the L-shaped, partly laterally closed and partly laterally open plate 28.4a determines how far both rotatable levers 28.5a may rotate.

Alternatively, the rotation of both rotatable levers is limited when at least one of clamping elements 32e, 32f comes in contact with the lower edge of the respective casing 29a.

When the deformable holder 10e is withdrawn and the locking pins 28.12 are moved back to the resting position, both rotatable levers 28.5a, moving from the accident-related position "P₂" or operative position "P₁" to the resting position "P", snap into the respective spaces, defined by the stop pieces 28.9a and the coupling walls 28.3, and are retained therein (FIG. 1a).

In the 1st embodiment the set of vibration-dampening energy absorbers 30, 40e, 40f (FIG. 10) comprises a retaining element 31, control-wire 37, control-clamping element 32 and complementary clamping elements 32.1 to 32.n (not drawn). After projecting through or into the cylinder-shaped edges 37c1 of control-clamping element 32, both end portions of complementary wire 37a1 of control-wire 37 are secured by clamping two brackets 37b1 or both cylinder-shaped ends 37c1 therewith. The inner diameter "$d_i$" of retaining element 31, 41 is a little larger than the outer diameter "$d_i$" of inner tubes 71, 72 (FIGS. 1, 1a, 8, 8a).

Figure 11:
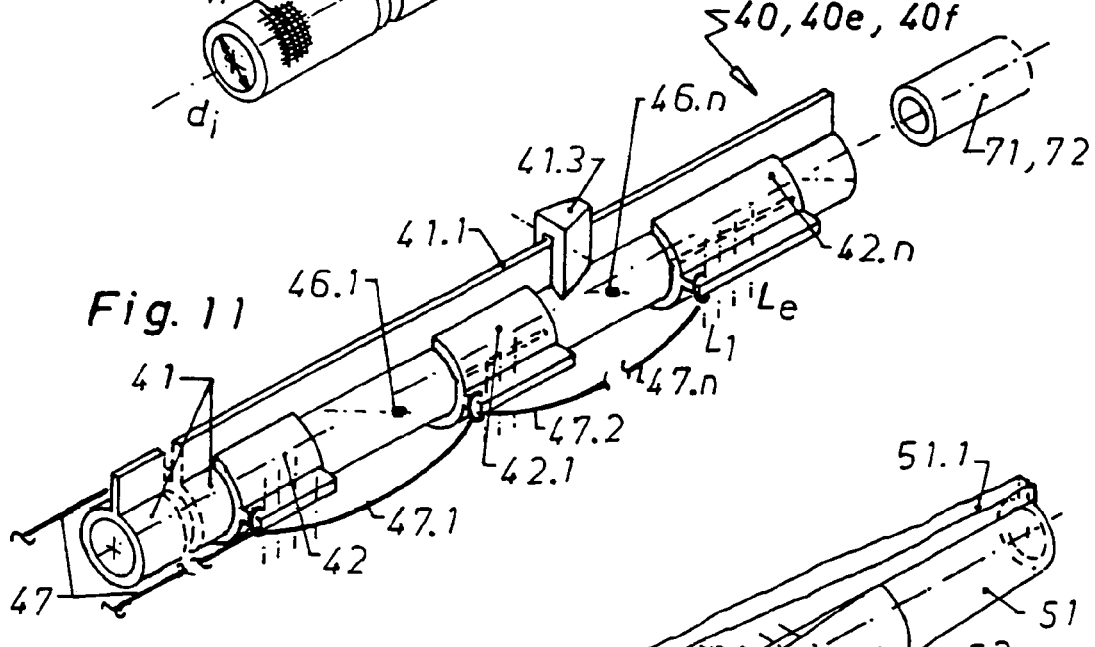
FIG. 11 is a schematic, perspective view of a 2nd embodiment of a set of energy absorbers 40, 40*e*, 40*f*.
Figure 11A:
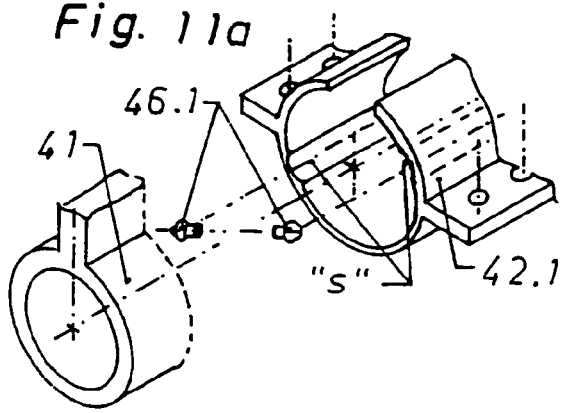
FIG. 11*a* is a partially enlarged perspective view of a clamping element with sites of predetermined fracture "s" and both heads of a stop pin to block the clamping element.

In the 2nd embodiment ref. to FIGS. 11, 11a the set of vibration-dampening energy absorbers 40, 40e, 40f comprises a retaining element 41, control-wire 47, control-clamping element 42 and complementary clamping elements 42.1 to 42.n. Owing to taut, less taut and/or loose connection of complementary wires 47.1, ..., 47.n with the clamping elements 42, 42.1, ..., 42.n, if necessary by occupying another pair of adjusting holes "$L_1$ to $L_e$", the onset of each clamping element, biased, is determinable. Owing to arbitrary connection of wires with arbitrary clamping elements the fracture of the clamping elements can be pre-determined in an arbitrary succession. Determinable, too, is the fracture of each clamping element to absorb energy, e.g. by reaming (bulging) the complementary clamping element 42.1, ..., 42.n in contact with both heads of stop pin or bolt 46.1, ..., 46.n with both sides of wedge-shaped stop element 41.3 or by fracture in excess of the yield strength when increasingly loaded.

Figure 12:
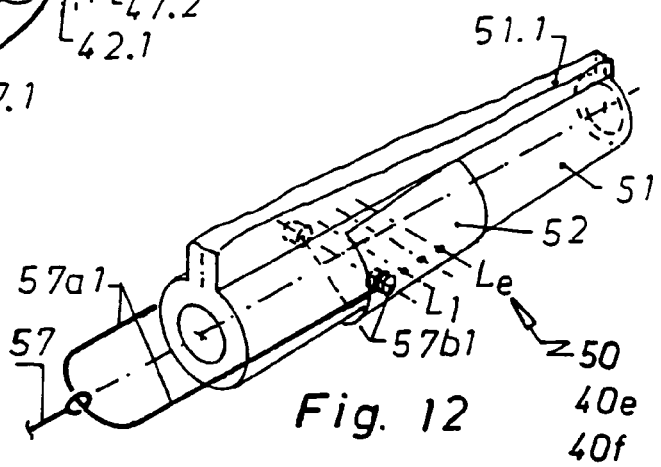
FIG. 12 is a schematic, perspective view of a 3rd embodiment of a set of energy absorbers 50, 40*e*, 40*f*.

In the 3rd embodiment ref. to FIG. 12 the set of vibration-dampening energy absorbers 50, 40e, 40f comprises a cone-shaped retaining element 51, control-wire 57, control-clamping element 52 and clamping elements 52.1, ..., 52.n and 53.1, ..., 53.n (not-shown). Both ends of complementary wire 57a1 of control-wire 57 are secured to a control-clamping element 52 by rivets 57b1.

The load-deflection area is achieved progressively or arbitrarily by the expansion of cone-shaped clamping element 52, ..., 52.n, 53, ..., 53.n along
    the cone-shaped retaining element 51 and/or
    the longitudinal rib 51.1 whose thickness longitudinally increases.

The space in the seat backrest and -cushion is exploited to accommodate a number of sets of energy absorbers, having different threshold values for baby, child, adult, old woman and man, which are connected to the shoulder- and/or neck holder and buckle assemblies, whereto the latch plates of, preferably, the multi-point, one-piece seat belt of the seat 3a to 3d, shown in FIG. 14, are plug-in connected. In a real-world accident this energy-absorbing, vibration-dampening device, operating without sensors, but with the multi-point, one-piece seat belt gradually absorbs great energy below the injury-related values and dampens vibrations. In comparison with the energy-absorbing management device, monitored by the three-sensor mechanisms, aforementioned and proposed by U.S. Pat. No. 5,544,918, the operation is more reliable, the injury severity is substantially lower, the manufacturing costs are far lower and there is neither recall programs nor court-cases.

In the 1st and 2nd embodiment of the buckle assembly 4a, 4b (FIGS. 13a and 13b), to receive latch plate 2, 11, 25, the one-piece guide piece 4.7a, 4.7b is provided with a recess 4.5a or longitudinal groove 4.5b to loosely guide tie band 1.1a, 1.1b, having coupling member 1.2a, 1.2b, to which the wires of sets of energy absorbers 30, 40, 50 are tautly, less tautly and/or loosely connected.

After the insertion, in the direction of double arrow, of a pair of engaging parts 4.10a, 4.10b of guide piece 4.7a, 4.7b in the apertures of the housing 4.8a, 4.8b of buckle assembly 4a, 4b the clamping parts 4.12 snap into the clamping holes 4.13.

When the latch plate is pulled under the load of "$\Delta F_1$-500 N", less than the starting threshold value "$\Delta F_1$", the buckle assembly, clamping element/s and energy absorber/s move about the deflection "$T_F$" (not drawn). In the state of non-deformation the housing 4.8a, 4.8b with/without clamping parts 4.12 must be pulled back into the engaging parts 4.10a, 4.10b. This is possible, when "$T_L$" is at least as long as "$T_S+T_F$". Experiment can clarify, whether the clamping parts and clamping holes are needed. However, the clamping assemblies have the advantage of exactly positioning the buckle assembly in the seat backrest or -cushion.

Due to the restriction for the depth "T" of seat backrest or -cushion (FIG. 14) the length "$T_L$" of engaging parts 4.10a, 4.10b is restricted too, hence, the following countermeasures are required:

When the buckle assembly under load of great impact energy moves along the engaging parts, the tie band 1.1a, 1.1b must be guided by the guide piece 4.7a, 4.7b, fastened to the seat frame;

In order to exploit the depth "T", the length "$T_Z$" of latch plate and/or the length "$T_L$" Of engaging parts 4.10a, 4.10b is/are increased;

By not using guide piece the wires of sets of energy absorbers can tautly, less tautly and/or loosely be connected to couple member 1.2a, 1.2b or an end of the seat belt; and/or Owing to biasing at least one control-clamping element 32, 42, 52 at "$\Delta F_1$-500 N" the housing can only move in excess thereof for the purpose of undampened energy-absorption.

Ref. to FIGS. 3, 13c to 13e, 14 a height- and width-adjusting mechanism 27, 27a of the seat 3c comprises a frame 39, at least one pair of buckle-assembly units 18.1 to 18.3, 19.1 to 19.3, a pair of tubes 27.4, members 27.5 to 27.9 and a pair of tubes 27.1 having a plurality of vertical locking slots, in form- and force-locking connection with an angle fitting 26a. The frame 39 consists of a pair of outer tubes 27.3, a pair of tubes 27.2 and a connecting member of all tubes.

The locking handle 27.5 is form- and force-locking connected to the slots of the inner tubes 27.4, which, movable in the outer tubes 27.3, are pre-loaded by the tube-springs 27.6.

Each tube-spring 27.6 on a sleeve 27.7, secured by pin 27.8, protruding through the holes of the inner tube 27.4, presses against the spring rest 27.9 of the outer tube 27.3. The locking handle 27.5 is in engagement with a pair of vertical locking slots of tubes 27.1. The locking handle 27.5, when pulled out from both slots, is detached therefrom. At the appropriate height for the passenger, sitting on the seat 3c, latch plates 25 are inserted into the pair of buckle-assembly units, shown in FIG. 14.

In the 3rd embodiment of the buckle assembly 4c (FIG. 13e) to receive latch plate 2, 9, 11, 25, the housing 4.8c, that can be moved along a pair of tube 27.3 of the frame of seat backrest or seat cushion and latched thereon, are provided with two holes 4.5c to loosely guide tie bands 1.5, 1.6, having coupling members 1.2a, 1.2b. A wire is projected through the hole 2.3 of buckle assembly 4c. Both end portions, serving as tie bands 1.5, 1.6, are secured by a common bracket 1.7. The engaging member 4.10c of buckle assembly 4c is in pig-tail- or form-locking connection to an aperture of housing 4.8c. Large height- and width-adjustment can result in slackness and inaccuracy when biasing the wires. Such shortcoming is resolved by directly attaching the sets of energy absorbers to the parts (not drawn) of the height- and width-adjustable mechanism, shown in FIG. 1.

The buckle assemblies 4a, 4b, 4c, having the release cable 4.2, the electrical motor 4.2b with a shaft 4.3b and release cable 4.3, are suited for buckle assemblies 4, 7, 8, 8a, 9.1, 18a/19a to 18n/19n of the seats 3a to 3c (FIG. 14). When the release cables 4.2 or 4.3 of the buckle assemblies are connected to the master release button 84 of lap buckle assembly 9.1 (FIG. 14) the depressing the master release button 84 results in disengaging of all latch plates of the seat belt and holder 10, 10a to 10c, 10f therefrom. This one-click operation increases the convenience of the passenger, when stepping out as well as facilitates the quick-rescue of the injured passenger in accidents.

Thanks to plug-in connection of at least one anti-submarining latch plate 11, 25, movable along the lap belt portion 1.3, with an anti-submarining buckle assembly 7, 8, 8a of the seat cushion (FIG. 14), provided with sets of energy absorbers, the energy, imposed on both thighs, in the event of sub-marining and/or rollover is absorbed and released by fracture of the sites of predetermined fracture. See anti-submarining seat-belt assembly ref. to US 7,131,668 B2 and CA 2,447,580. To properly restrain both thighs of a child, sitting on the seat 3a, three movable anti-submarining latch plates 11, 25 are in plug-in connection with the respective anti-submarining buckle assemblies 7, 8a. So a safety child-seat 85a, 85b is created by integration the seat belt, energy absorbers and holder into the seat itself. Another application results from direct conversion of a child-seat 85a into a baby-cot 86 by flipping the seat backrest 3.2a into a baby-resting position or a safety adult-seat 85a by disconnecting the movable latch plates 25 from the anti-submarining buckle assemblies 8a, repositioning the seat backrest to an adult-seating position and mounting the holder 10a back into the cutaway of the seat cushion.

Thanks to the multi-purpose of energy-absorbing, vibration-dampening safety seat a high rate of seat occupancy in an aeroplane can be achieved and there is no need for purchasing child-seats and baby-cots, administrating, storing and transporting them anymore.

For safety reasons and easy access the latch plates 25, when not being used, are stored in a storage box 25.2 (FIG. 14). The belt-detachable latch plates 25, each having a quick-release pin 25.1 (FIG. 15), are attached to any belt portion 1.1, 1.2, 1.3 when needed (FIG. 14).

Notably, any passenger of any age, body proportion and weight is protected from severe/fatal injury by the energy-absorbing device incorporated with the multi-point seat belt and insertable or rotatable attachment of the shoulder- and/or neck holder 10, 10a to 10f to the seat backrest frame.

Lack of functional tests to determine the permeability, stiffness and design of the caps and properties of energy-absorption it is necessary to design a number of holders to restrain the upper part of body 95 of a passenger (dummy), restrained, preferably, by the multi-point seat belt, in order to determine the cheapest design characterized by the best mode to reduce all acceleration-dependant forces, dampen vibrations and avoid whiplash in crash tests.

Although the present invention has been described and illustrated in detail, it is clearly understood that the terminology used is intended to describe rather than limit. Many more objects, embodiments, features and variations of the present invention are possible in light of the above-mentioned teachings. Therefore, within the spirit and scope of the appended claims, the present invention may be practised otherwise than as specifically described and illustrated.

OTHER PUBLICATIONS

[1] Car-Magazine ADAC 1/95
[2] Car-Magazine AMS (Auto Motor und Sport) 23/97
[3] Car-Magazine AMS 12/99, Newspapers Wiesbadener Kurier of 28.12.98, 20.01, 22.06, 04.11.99, Frankfurter Allgemeine Zeitung of 08.09.99, Frankfurter Rundschau of 12.06.99
[4] Wiesbadener Tagsblatt of 28.12.97 reporting 100 injured passengers, 10 among them severely injured, in an insight turbulence, to which their Boeing 747 was subjected.
[5] Wiesbadener Tagsblatt of 15.04.99 reporting 30 injured passengers in an inflight turbulence, to which their Boeing 747 was subjected.
[6] Police accident report and photos documenting the steering wheel and -column totally deformed by a head when a 34 year-old driver of a brand-new BMW was thrown forward.
[7] Police accident report and accident report by Go documenting the instant death of a 34 year-old female lawyer in a BMW Z3, into the co-driver side of which a Honda Civic crashed in the city Wiesbaden.
[8] 34-page accident report by Go concerning severe/fatal injuries, submarining, head injuries and whiplash-related injuries resulted from failure of conventional seat belts etc. to four German Ministers, General Attorney, Vice General Attorney, Senior Attorneys, Police Chief Directors, Police Directors etc.

VDI (Verein Deutscher Ingenieure) Rheingau Regional-Magazin issue 1/2006 "Sicherheit im Auto in Simulation und Wirklichkeit". Author: Giok Djien Go. One of the theses addresses NCAP- and NHSTA test crashes, in which vibrations, yaw-, pitch- and roll-accelerated moments, alternate forces and the very low threshold values of inner organs are not specified at all and the boundary condition of which is wrong. As a result, the test results are wrong.

Auto Motor und Sport issue 10/2002 "Wichtigste Aufgabe der Sicherheitsforschung" One of the theses addresses innovative, energy-absorbing, vibration-dampening shoulder- and neck holders in conjunction with energy-absorbing, vibration-dampening multi-point seat belts.

What is claimed is:

1. A restraint system equipped with a rotatable shoulder holder to increase survival chance in a real-world accident of a vehicle, train or an aeroplane or in an inflight turbulence, comprising a seat belt (1d, 1e), consisting of several belt portions, at least one latch plate, a lap buckle assembly (9.1), a belt pretensioner and belt fittings;

the rotatable shoulder holder (10d), having a pair of shoulder caps (10.2d), which, when in a resting position, are located in a seat backrest (3.2d, 3.2e); and a rotatable device (28), having a pair of rotatable levers (28.5), retained by stop pieces (28.9) in the resting position, where the rotatable levers (28.5), having first ends, connected to the pair of shoulder caps (10.2d), and second ends, connected to each other by a shaft (28.7), are rotatably attached to a pair of casings (29), each of which, defined by an L-shaped plate (28.4) and two outer tubes (28.1, 28.2), connected to each other by a coupling wall (28.3), is height-adjustable, latchable and guided by inner tubes (71, 72) of a seat backrest frame (3.4d, 3.4e);

wherein a passenger is restrained by the seat belt (1d, 1e) and his shoulders are restrained by the shoulder caps (10.2d), moved by the rotatable device, when operated from the resting position to an operative position;

where at least one shoulder belt portion of the seat belt (1d, 1e) is extended over the respective shoulder cap and a U-shaped plate (10.15) thereof, when the rotatable levers (28.5) are rotated, causing release cams (28.6) of the rotatable levers to force a rotation of lock pawls (28.8), pre-loaded by first springs (28.10), thereby permitting locking pins (28.12), pre-loaded by second springs (28.13) and loosely guided in guide tubes (28.11), to move into holes (28.14) of the casings (29) and block the rotatable levers in both directions.

2. A restraint system equipped with a rotatable shoulder holder to increase survival chance in a real-world accident of a vehicle, train or an aeroplane or in an inflight turbulence, comprising a seat belt (1, 1e), consisting of several belt portions, at least one latch plate, a lap buckle assembly (9.1), a belt pretensioner and belt fillings;

the rotatable shoulder holder (10e), having a pair of shoulder caps (10.2e), which, when in a resting position, are located on an upper portion of a seat backrest (32d, 3.2e); and a motor-driven rotatable device (28a), having a drive apparatus (80) and a pair of rotatable levers (28.5a), having first ends, connected to the pair of shoulder caps (10.2e), and second ends, connected to each other by a shaft (28.7), are rotatably attached to a pair of casings (29a), each of which, defined by an L-shaped, partly laterally closed and partly laterally open plate (28.4a) and two outer tubes (41e, 41f), connected to each other by a coupling wall (28.3), is height adjustable, latchable and guided by inner tubes (71, 72) of a seat backrest frame (3.4d, 3.4e); and vibration-dampening energy absorbers (40e, 40f), having a number of clamping members (42e, 42f) provided with sites of predetermined fracture(s), biased, arranged along the outer tubes (41e, 41f) and tautly, less tautly or loosely connected to the pair of rotatable levers via stop pieces (28.9a) by corresponding wires (47e, 47f);

wherein a passenger is restrained by the seat belt (1, 1e) and his shoulders are restrained by the shoulder caps (10.2e), moved by the rotatable device, driven by the drive apparatus (80), from the resting position to an operative position;

where at least one shoulder belt portion of the seat belt (1, 1e) is extended over the respective shoulder cap and a U-shaped plate (10.15) thereof, when the rotatable levers (28.5a) are rotated by the drive apparatus (80), causing release cams (28.6a) of the rotatable levers to force a rotation of lock pawls (28.8a), pre-loaded by first springs (28.10a), thereby permitting locking pins (28.12), pre-loaded by second springs (28.13) and loosely guided in guide tubes (28.11), to move into holes (28.14) of the casings (29a) and block the rotatable levers in one direction;

where in the real-world accident or in the inflight turbulence a forward motion of the torso and head rotates the rotatable levers in another direction through the openings of the L-shaped, partly laterally closed and partly laterally plates (28.4a), thus moving the clamping members (42e, 42f) along the corresponding tubes (41e, 41f) resulting in a work of deformation and friction, during which vibrations are dampened and a stored energy is released by fracture of the sites of predetermined fracture of the clamping members in excess of respective threshold values.

3. The restraint system according to claim 2, wherein the shoulder cap (10.2e), recessed about a supporting tube (3.61) of a head rest (3.6), is reinforced by a reinforcing plate (10.13).

4. The restraint system according to claim 2, wherein in the operative position the shoulders and a neck are restrained by a rotatable shoulder- and neck holder (10e), defined by the rotatable shoulder holder (10e) and a neck holder, having a pair of neck caps (10.4, 10.4b), attached to the pair of shoulder caps (10.2e).

5. The restraint system according to claim 4 wherein the drive apparatus (80) is activated by a separately operated switch.

6. The restraint system according to claim 4, wherein the drive apparatus is activated when a speed, monitored by a controller, exceeds a threshold speed.

7. The restraint system according to claim 4, wherein the drive apparatus is activated by an accelerator pedal.

8. The restraint system according to claim 4, wherein the drive apparatus is activated when a sensor senses an acceleration, which exceeds a threshold acceleration.

9. The restraint system according to claim 4, wherein upon a pressure on a release button (84o, 87a to 87c), attached to a seat, the drive apparatus (80) moves the rotatable shoulder- and neck holder back from the operative position to the resting position while the passenger remains belted.

10. The restraint system according to claim 4, wherein the lap buckle assembly (9.1) has a master release button (84), which is connected to a switch of the drive apparatus (80), where the master release button (84), when depressed, moves the rotatable shoulder- and neck holder back from the operative position to the resting position and releases the seat belt from restraining the passenger.

11. The restraint system equipped with the rotatable shoulder- and neck holder according to claim 4, further comprising at least one supplemental vibration-dampening energy absorber (30, 40, 50), which consists of a retaining element (31, 41, 51), serving as a member of a seat frame, generally representing a seat-cushion- or seat backrest frame, and at least one clamping element (32, 32.1 to 32.n, 42, 42.1 to 42.n, 52, 52.1 to 52.n), biased, arranged along the retaining element, provided with sites of predetermined fracture(s), which have at least one threshold value, and tautly, less tautly or loosely connected to the clamping members (42e, 42f) by a control-wire (37, 47, 57).

12. A restraint system equipped with an insertable shoulder holder to increase survival chance in a real-world accident of a vehicle, train or an aeroplane or in an inflight turbulence, comprising a three or multi-point seat belt (1, 1b, 1e), comprising lap-, shoulder- and extending belt portions, at least one latch plate, a lap buckle assembly (9.1), a belt pretensioner and belt fittings;

the insertable shoulder holder (10, 10b, 10f), having a pair of shoulder caps (10.2, 10.2b, 10.2f) with first open apertures;

in one of which the shoulder belt portion of the three-point seat belt is received; or in which both shoulder belt portions of the multi-point seat belt are received;

at least one pair of supplemental buckle assemblies (18a/19a to 18n/19n), attached in a seat backrest (3.2a, 3.2c); and a pair of shoulder latch plates (10.1b), connected to the shoulder caps (10.2, 10.2b, 10.2f) and having plug-in holes for ensuring a plug-in connection with the supplemental buckle assemblies and second open apertures;

in one of which the shoulder belt portion of the three-point seat belt is loosely secured by a quick-release pin (10.10), when the insertable shoulder holder and the three-point seat belt are fitted together, and released by withdrawal thereof for removal, when the insertable shoulder holder is withdrawn; or in which the shoulder belt portions of the multi-point seat belt are loosely secured by quick-release pins (10.10), when the insertable shoulder holder and the multi-point seat belt are fitted together, and released by withdrawal thereof for removal, when the insertable shoulder holder is withdrawn;

wherein a passenger is restrained by the three- or multi-point seat belt (1, 1b, 1e) and his shoulders are restrained by the shoulder caps (10.2, 10.2b, 10.2f) upon the plug-in connection of the shoulder latch plates (10.1b) with the supplemental buckle assemblies (18a/19a to 18n/19n); and the shoulder belt portion of the three-point seat belt is extended over the corresponding, first open aperture and loosely secured in the corresponding, second open aperture by the quick-release pin; or the shoulder belt portions of the multi-point seat belt are extended over both first open apertures and loosely secured in both second open apertures by the quick-release pins.

13. The restraint system according to claim 12, wherein in the operative position the shoulders and a neck are restrained by an insertable shoulder- and neck holder (10, 10b, 10f), defined by the insertable shoulder holder (10, 10b, 10f) and a neck holder, having a pair of neck caps (10.4, 10.4b), insertably attached to the pair of shoulder caps (102, 10.2b, 10.2f), where the neck caps can be detached therefrom and removed.

14. The restraint system according to claim 13, wherein the insertable shoulder- and neck holder (10, 10b, 10f) is provided with at least one cap energy absorber (10.3, 10.3a, 10.5, 10.5a, 10.5c).

15. The restraint system according to claim 14, wherein the cap energy absorber is releasably attached to the shoulder- or neck cap by an adhesive fastener and detachable therefrom by opening the fastener.

16. The restraint system according to claim 14, wherein the cap energy absorber is shoulder-shaped.

17. The restraint system according to claim 14, wherein the neck cap is neck-shaped.

18. The restraint system according to claim 14, wherein the cap energy absorber is neck-shaped.

19. The restraint system according to claim 18, wherein the cap energy absorber (10.5a), arranged in the neck cap (10.4a), serves as a neck collar having a wide portion for a chin.

20. The restraint system according to claim 13, wherein the shoulder- and neck cap, provided with a height-flange (10.12), is adjustable in height by rotating a height-bolt (10.7) in a threaded hole of the height-flange (10.12).

21. The restraint system according to claim 13, wherein the shoulder- and neck cap, provided with a width-flange (10.12f), is adjustable in width by rotating a width-bolt (10.6a) in a threaded hole of the width-flange (10.12f).

22. The restraint system according to claim 13, further comprising at least one vibration-dampening energy absorber (30, 40, 50), which consists of
 a retaining element (31, 41, 51), serving as a member of a seat frame, generally representing a seat-cushion- or seat backrest frame, and
 at least one clamping element (32, 32.1 to 32.n, 42, 42.1 to 42.n, 52, 52.1 to 52.n), tautly, less tautly or loosely connected to the supplemental buckle assembly of the seat backrest by a control-wire (37, 47, 57), biased, arranged along the retaining element and provided with sites of predetermined fracture(s), which have at least one threshold value.

23. The restraint system according to claim 22, wherein the retaining element is integrated into the seat frame.

24. The restraint system according to claim 22, wherein the clamping element has open and tube-shaped profile.

25. The restraint system according to claim 22, wherein the retaining element is tube-shaped.

26. The restraint system according to claim 22, wherein a longitudinal rib (41.1, 51.1) is arranged to the retaining element.

27. The restraint system according to claim 26, wherein both edges of the clamping element are loosely guided by the longitudinal rib in longitudinal direction.

28. The restraint system according to claim 27, wherein end portions of a complementary wires (37a1), connected to the control-wire (37), are inserted into both cylinder-shaped edges (37c1) of the clamping elements (32) and secured by clamping the cylinder-shaped edges (37c1).

29. The restraint system according to claim 26, wherein a stop element (41.3) is arranged to the longitudinal rib.

30. The restraint system according to claim 26, wherein the thickness of the longitudinal rib increases in longitudinal direction, in which the clamping element moves.

31. The restraint system according to claim 22, wherein the clamping element is cone-shaped.

32. The restraint system according to claim 22, wherein the retaining element (51) is cone-shaped.

33. The restraint system according to claim 22, wherein at least one stop pin (46, 46.1 to 46.n) is laterally arranged to the retaining element, where the stop pin blocks a movement of the clamping element, thus resulting in fracture of the sites of predetermined fracture.

34. The restraint system according to claim 22, wherein contact surfaces of the retaining element have arbitrary friction coefficients ($\mu_0$).

35. The restraint system according to claim 22, wherein contact surfaces of the retaining element are provided with a soundproofing material (83).

36. The restraint system according to claim 22, wherein contact surfaces of the clamping element have arbitrary friction coefficients ($\mu_0$).

37. The restraint system according to claim 22, wherein contact surfaces of the clamping element are provided with a soundproofing material (83).

38. The restraint system according to claim 22, wherein the clamping element is provided with a pair of ribs, whereto several pairs of adjusting holes ($L_1$ to $L_e$) are arranged.

39. The restraint system according to claim 22, wherein a set of vibration-dampening energy absorbers comprises the retaining element, at least one stop pin, at least one stop element, one control-clamping element, connected to the control-wire, and complementary clamping elements with sites of predetermined fracture, where all clamping elements, arranged along the retaining element, are tautly, less tautly or loosely connected to each other by complementary wires.

40. The restraint system according to claim 39, wherein an energy-absorbing, vibration-dampening device comprises a couple member (1.2a, 1.2b) and the sets of vibration-dampening energy absorbers, the control-wires of which are tautly, less tautly or loosely connected to the couple member.

41. The restraint system according to claim 40, wherein a guide piece (4.7a), fastened to the seat frame, has
 a pair of engaging parts (4.10a, 4.10b), form-locking connected to the corresponding apertures of a housing (4.8a, 4.8b) of the supplemental buckle assembly; and
 a hole (4.5a, 4.5b) to loosely guide a tie band (1.1a, 1.1b), having a first and second end connected to the supplemental buckle assembly and the couple member.

42. The restraint system according to claim 40, wherein a housing (4.8c), movable along a pair of tubes (27.3) of the seat backrest frame and latchable thereon, has
 an aperture to receive an engaging part (4.10c) of the supplemental buckle assembly, through a hole (2.3) of which a wire is protruded and both end portions of the wire, serving as be bands, are secured by a mutual bracket (1.7); and
 two holes (4.5c) to loosely guide the tie bands, connected to the couple members.

43. The restraint system according to claim 13, wherein the lap buckle assembly has a master release button (84),
 provided with release cables (4.2) connecting to release buttons of the pairs of supplemental buckle assemblies of the seat backrest, to one of which the shoulder latch plates of the insertable shoulder- and neck holder are plug-in connected;
 where the master release button (84), when depressed, disengages all the latch plates of the insertable shoulder- and neck holder and the seat belt.

44. The restraint system according to claim 43, wherein the insertable shoulder- and neck holder is attached to a seat for the purpose of storage and detachable therefrom by depressing a release button of the seat.

45. An energy-absorbing, vibration-dampening safety seat according to claim 44, wherein
- sets of vibration-dampening energy absorbers, the seat belt, the insertable shoulder- and neck holder and the seat are integrated into a safety adult-seat;
- which is transformed into a safety child-seat when a detachable front portion of the seat cushion (3.1*a*) serves as the insertable shoulder- and neck holder (10*a*), the shoulder latch plates of which are plug-in connected to one of the pairs of supplemental buckle assemblies (18*a*/19*a* to 18*n*/19*n*) of the seat backrest, to restrain shoulders and a neck of a belted child and the space thereof is exploited to accommodate legs of the child sitting on the rear portion thereof;
- where the safety child-seat can be converted back into the safety adult-seat.

46. An energy-absorbing, vibration-dampening safety baby-cot according to claim 45, wherein
- the safety child-seat is transformed into the energy-absorbing, vibration-dampening safety baby-cot when the seat backrest is flipped downwards;
- where the safety baby-cot can directly be converted back either into the safety child-seat or into the safety adult-seat.

47. The restraint system according to claim 43, wherein
- a common release button (84*o*), located on the seat cushion, is provided with release cables (4.2) connecting to release buttons of the pairs of supplemental buckle assemblies of the seat backrest, to one of which the shoulder latch plates of the insertable shoulder- and neck holder are plug-in connected;
- where the common release button (84*o*), when depressed, disengages the shoulder latch plates of the shoulder- and neck holder while the passenger remains belted.

48. The restraint system according to claim 12, wherein the shoulder cap is shoulder-shaped.

49. The restraint system according to claim 12, wherein the shoulder latch plate of the insertable shoulder holder is provided with a latch energy absorber (10.9).

50. The restraint system according to claim 12, wherein the lap buckle assembly has a master release button (84),
- provided with release wires connecting to electrical motors (4.2*b*) of release buttons of the pairs of supplemental buckle assemblies of the seat backrest, to one of which the shoulder latch plates of the insertable shoulder holder are plug-in connected;
- where the master release button (84), when depressed, disengages all the latch plates of the insertable shoulder holder and the seat belt.

51. The restraint system according to claim 50, wherein the insertable shoulder holder is attached to a seat for the purpose of storage and detachable therefrom by depressing a release button (87*a* to 87*c*) of the seat.

52. A restraint system equipped with an insertable, one-piece shoulder- and neck holder to increase survival chance in a real-world accident of a vehicle, train or an aeroplane or in an inflight turbulence, comprising
- a three- or multi-point seat belt (1*a*, 1*c*, 1*e*), comprising lap-, shoulder- and extending belt portions, at least one latch plate, a lap buckle assembly (9.1), a belt pretensioner and belt fittings;
- the insertable, one-piece shoulder- and neck holder (10*a*, 10*c*), defined by a neck cap (10.4*a*, 10.4*c*) and a shoulder cap (10.2*a*, 10.2*c*) with first open apertures;
    - in one of which the shoulder belt portion of the three-point seat belt is received; or
    - in which both shoulder belt portions of the multi-point seat belt are received;
- at least one pair of supplemental buckle assemblies (18*a*/19*a* to 18*n*/19*n*), attached in a seat backrest (3.2*a*, 3.2*c*); and
- a pair of shoulder latch plates (10.1*b*), connected to the shoulder cap (10.2*a*, 10.2*c*) and having plug-in holes for ensuring a plug-in connection with the supplemental buckle assemblies and second open apertures;
    - in one of which the shoulder belt portion of the three-point seat belt is loosely secured by a quick-release pin (10.10), when the insertable, one-piece shoulder- and neck holder and the three-point seat belt are fitted together, and released by withdrawal, thereof for removal, when the insertable, one-piece shoulder- and neck holder is withdrawn; or
    - in which the shoulder belt portions of the multi-point seat belt are loosely secured by quick-release pins (10.10), when the insertable, one-piece shoulder- and neck holder and the multi-point seat belt are fitted together, and released by withdrawal thereof for removal, when the insertable, one-piece shoulder- and neck holder is withdrawn;

wherein
- a passenger is restrained by the three or multi-point seat belt (1*a*, 1*c*, 1*e*) and his shoulders and his neck are restrained by the shoulder cap (10.2*a*, 10.2*c*) and neck cap (10.4*a*, 10.4*c*) upon the plug-in connection of the shoulder latch plates (10.1*b*) with the supplemental buckle assemblies (18*a*/19*a* to 18*n*/19*n*); and
- the shoulder belt portion of the three-point seat belt is extended over the corresponding, first open aperture and loosely secured in the corresponding, second open aperture by the quick-release pin; or
- the shoulder belt portions of the multi-point seat belt are extended over both first open apertures and loosely secured in both second open apertures by the quick-release pins.

\* \* \* \* \*